US011528958B2

(12) United States Patent
Bandyopadhyay et al.

(10) Patent No.: US 11,528,958 B2
(45) Date of Patent: Dec. 20, 2022

(54) MULTI-LAYERED STRUCTURES AND USES THEREOF

(71) Applicant: NIKE, Inc., Beaverton, OR (US)

(72) Inventors: Diya Bandyopadhyay, Portland, OR (US); Yihua Chang, Portland, OR (US); Christopher J. Dimitriou, Portland, OR (US); Richard L. Watkins, Portland, OR (US); John R. Wright, Beaverton, OR (US); Fred Lamar, Washington, MO (US)

(73) Assignee: NIKE, INC., Beaverton, OR (US)

( * ) Notice: Subject to any disclaimer, the term of this patent is extended or adjusted under 35 U.S.C. 154(b) by 593 days.

(21) Appl. No.: 16/498,430

(22) PCT Filed: Jun. 23, 2017

(86) PCT No.: PCT/US2017/039087
§ 371 (c)(1),
(2) Date: Sep. 27, 2019

(87) PCT Pub. No.: WO2018/005295
PCT Pub. Date: Jan. 4, 2018

(65) Prior Publication Data
US 2021/0085023 A1 Mar. 25, 2021

Related U.S. Application Data

(60) Provisional application No. 62/467,551, filed on Mar. 6, 2017, provisional application No. 62/394,054, filed on Sep. 13, 2016, provisional application No. 62/356,350, filed on Jun. 29, 2016.

(51) Int. Cl.
| | | |
|---|---|---|
| A43B 13/12 | (2006.01) | |
| B60C 1/00 | (2006.01) | |
| A43B 13/02 | (2022.01) | |
| A43B 13/04 | (2006.01) | |
| A43B 7/144 | (2022.01) | |
| A43B 13/20 | (2006.01) | |

(52) U.S. Cl.
CPC ............ *A43B 13/122* (2013.01); *A43B 7/144* (2013.01); *A43B 13/02* (2013.01); *A43B 13/04* (2013.01); *A43B 13/12* (2013.01); *A43B 13/125* (2013.01); *A43B 13/206* (2013.01); *B60C 1/00* (2013.01)

(58) Field of Classification Search
CPC ..... A43B 7/144; A43B 7/1415; A43B 13/122; A43B 13/206; A43B 13/12; A43B 13/125; A43B 13/02; A43B 13/04; B60C 1/00; B60C 11/00; B60C 19/08; C08L 21/00
See application file for complete search history.

(56) References Cited

U.S. PATENT DOCUMENTS

| | | |
|---|---|---|
| 3,427,366 A | 2/1969 | Verdol et al. |
| 5,094,793 A | 3/1992 | Schrenk et al. |
| 5,269,995 A | 12/1993 | Ramanathan et al. |
| 5,670,102 A | 9/1997 | Perman et al. |
| 5,938,869 A | 8/1999 | Kaido et al. |
| 6,082,025 A | 7/2000 | Bonk et al. |
| 6,218,024 B1 | 4/2001 | Tamber et al. |
| 6,730,379 B2 | 5/2004 | Bonk et al. |
| 8,101,671 B2 | 1/2012 | Kanae et al. |
| 8,801,884 B2 | 8/2014 | Hashimura et al. |
| 10,377,112 B2 | 8/2019 | Chang et al. |
| 2002/0045040 A1 | 4/2002 | Kanada et al. |
| 2003/0225201 A1 | 12/2003 | Yamana et al. |
| 2003/0235670 A1 | 12/2003 | Shepard et al. |
| 2005/0031816 A1 | 2/2005 | Chang et al. |
| 2006/0237122 A1 | 10/2006 | Dhawan et al. |
| 2007/0141282 A1 | 6/2007 | Chang et al. |
| 2008/0027176 A1 | 1/2008 | Nishioka et al. |
| 2008/0045643 A1 | 2/2008 | Henning et al. |
| 2009/0209670 A1 | 8/2009 | Kanae et al. |
| 2010/0071823 A1* | 3/2010 | Tomoi ................ B29D 30/0681 152/510 |
| 2012/0237742 A1 | 9/2012 | Tai et al. |
| 2013/0109799 A1* | 5/2013 | Weber ...................... C08K 3/04 524/508 |
| 2013/0186539 A1 | 7/2013 | Takahashi et al. |
| 2014/0007647 A1 | 1/2014 | Mannal et al. |
| 2014/0039080 A1 | 2/2014 | Amamoto et al. |
| 2014/0076474 A1 | 3/2014 | Amamoto et al. |
| 2014/0096882 A1 | 4/2014 | Kitano et al. |
| 2014/0099490 A1 | 4/2014 | Kitano et al. |
| 2014/0124114 A1 | 5/2014 | Hayashi et al. |
| 2014/0316023 A1 | 10/2014 | Amamoto et al. |
| 2014/0326376 A1 | 11/2014 | Amamoto et al. |
| 2015/0125685 A1 | 5/2015 | Kitano et al. |
| 2016/0075113 A1 | 3/2016 | Chang et al. |

(Continued)

FOREIGN PATENT DOCUMENTS

| | | |
|---|---|---|
| CN | 1178812 A | 4/1998 |
| CN | 101563398 A | 10/2009 |

(Continued)

OTHER PUBLICATIONS

Harris, C.M., et al.; Harris' Shock and Vibration Handbook, 2002, Chapter 33, p. 33.1-33.18.*

(Continued)

*Primary Examiner* — Robert S Jones, Jr.

(74) *Attorney, Agent, or Firm* — Thomas | Horstemeyer, LLP

(57) ABSTRACT

Multi-layered structures and methods for producing them are disclosed.

28 Claims, 6 Drawing Sheets

(56) References Cited

U.S. PATENT DOCUMENTS

| | | | |
|---|---|---|---|
| 2019/0127618 A1 | 5/2019 | Kuramochi et al. | |
| 2020/0087512 A1 | 3/2020 | Chang et al. | |
| 2021/0085023 A1 | 3/2021 | Bandyopadhyay et al. | |

FOREIGN PATENT DOCUMENTS

| | | | |
|---|---|---|---|
| CN | 102223816 | A | 10/2011 |
| CN | 103038299 | A | 4/2013 |
| CN | 103118871 | A | 5/2013 |
| CN | 104441853 | A | 3/2015 |
| DE | 102009009589 | A1 | 9/2010 |
| JP | 2002-210872 | | 7/2002 |
| JP | 2002210872 | | 7/2002 |
| TW | I256961 | B | 6/2006 |
| WO | 2005017024 | A2 | 2/2005 |
| WO | 2005023036 | A2 | 3/2005 |
| WO | 2007025690 | A1 | 3/2007 |
| WO | 2009017868 | A1 | 2/2009 |
| WO | 2012112483 | A1 | 8/2012 |
| WO | 2012165441 | A1 | 12/2012 |
| WO | 2013013784 | A1 | 1/2013 |
| WO | 2013074338 | A1 | 5/2013 |
| WO | 2013168676 | | 11/2013 |
| WO | 2016040893 | A1 | 3/2016 |
| WO | 2017187968 | A1 | 11/2017 |
| WO | 2018187249 | | 10/2018 |
| WO | 2019079692 | A1 | 4/2019 |
| WO | 2019079715 | A1 | 4/2019 |
| WO | 2019079720 | A1 | 4/2019 |

OTHER PUBLICATIONS

International Search Report from PCT/US2017/039087 dated Sep. 29, 2017.
Adhikari Correlations Between Molecular Architecture, Morphology and Deformation Behaviour of Styrene/Butadiene Block Copolymers and Blends, p. 162, 2011.
Cray Valley Application Bulletin, entitled "Novel Polybutadiene Diols for Thermoplastic Polyurethanes", 2010.
Miller-Chou et al., A Review of Polymer Dissolution, Prog. Polym. Sci. 28, p. 1223-1270, 2003.
Ovejero et al., Solubility and Flory Huggins Parameters of SVES, poly(styrene-b-butene/ethylene-b-styrene) triblock copolymer, determined by intrinsic visocity, European Polymer Journal 43, p. 1444-1449, 2007.
Written Opinion for PCT/US2017/039087 dated Sep. 29, 2017.
Hoven, Vipavee P.; et al., "Reduction of Offensive Odor from Natural Rubber by Odor-Reducing Substances", Mar. 9, 2004, Journal of Applied Polymer Science, vol. 92, p. 2253 (Year: 2004).
Corrosionpedia, "Curing Agent", Dec. 28, 2015, p. 1 (Year: 2015).
Kamarulzaman, Nor H.; et al., "Identification of VOCs from natural rubber by different headspace techniques coupled using GC-MS", Sep. 7, 2018, Talanta (Year: 2018).
Adhikari, Rameshwar, "Correlations Between Molecular Architecture, Morphology and Deformation Behaviour of Styrene/Butadiene Block Copolymers and Blends", (Nov. 30, 2011), 162 pgs.
International Preliminary Report on Patentability for PCT/2017/039087 dated Jul. 30, 2018.
International Preliminary Report on Patentability for PCT/US2015/049827 dated Dec. 20, 2016.
International Preliminary Report on Patentability for PCT/US2019/045500 dated Jun. 23, 2020.
International Search Report and Written Opinion for PCT/US2015/049827 dated Dec. 3, 2015.
International Search Report and Written Opinion from PCT/US2017/039087 dated Sep. 29, 2017.
International Search Report PCT/US2019/045500 dated Nov. 15, 2019.
Hanhi, Kalle; et al., "Elastomeric Materials", 2007, Tampere University of Technology, pp. 16-18 and 55-57 (Year 2007).
Vimalasiri, et al., "A Rapid and Accurate Method for Determining the Volatile Matter Content of Raw Natural Rubber", Rubber Research Institute 'Dartonfield', Agalawatta, Sri Lanka, Polymer Testing 7 (1987) pp. 317-323.
Kasner, et al., "Porosity in Rubber, A Review", Department of Polymer Science, The University of Akron, PSCI 425, Akron, OH, vol. 69, Oct. 1995, pp. 429, 436, and 439-440.

* cited by examiner

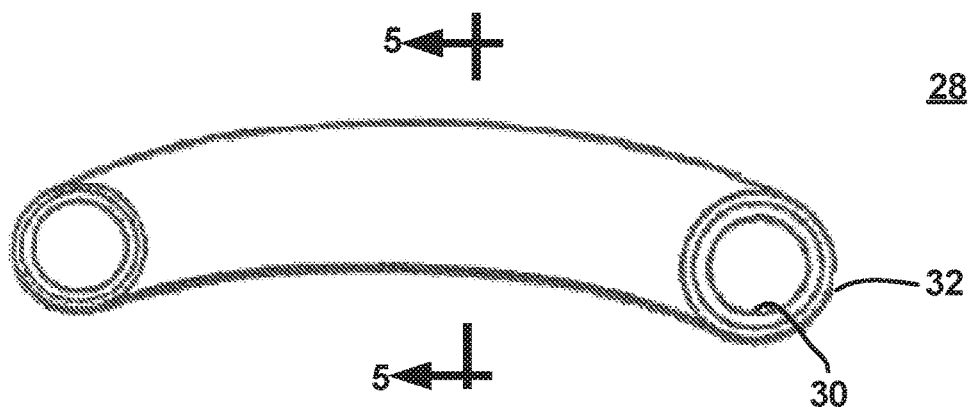
Fig. 4
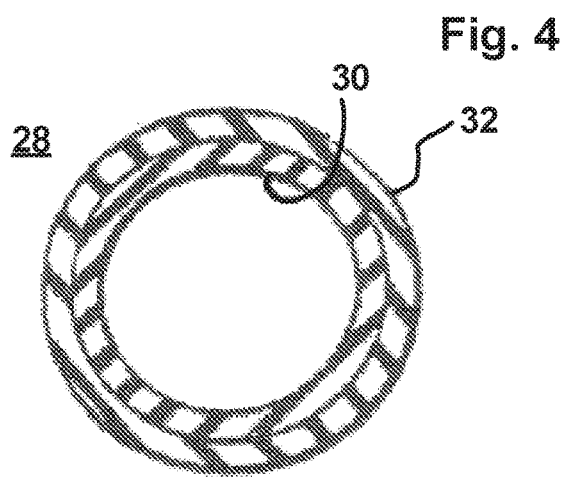
Fig. 5
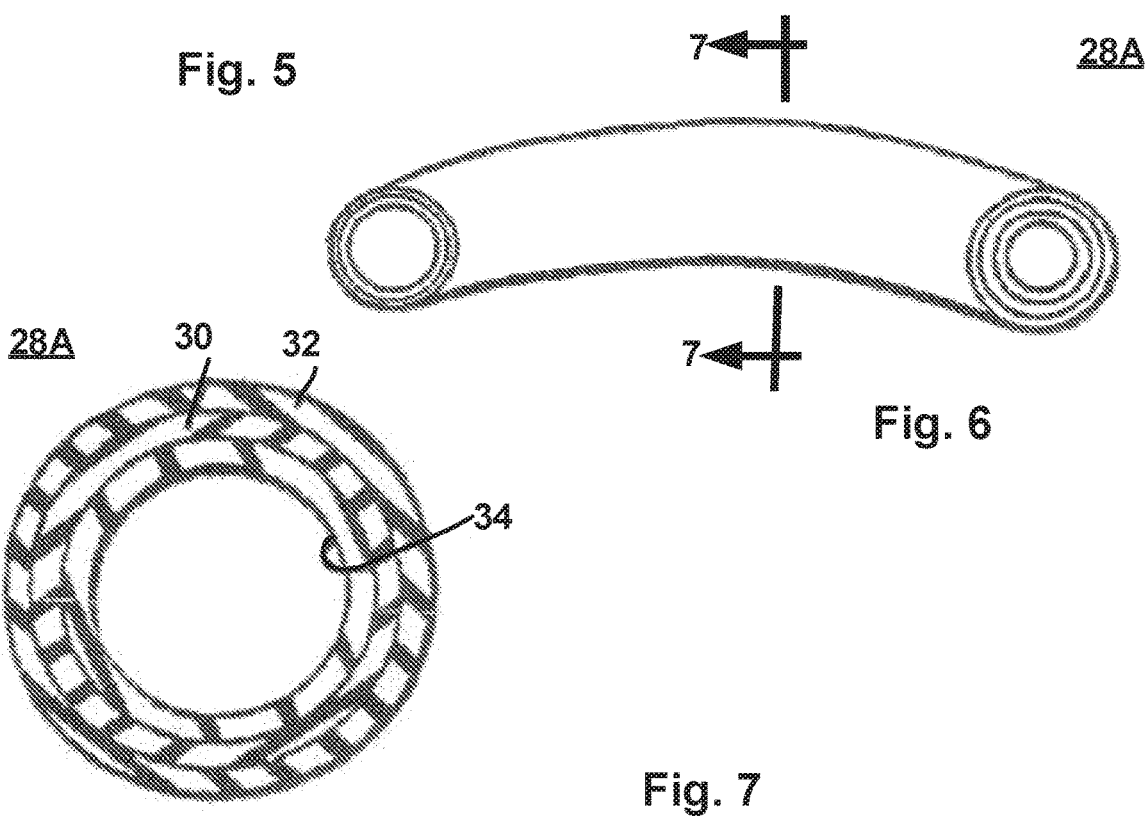
Fig. 6
Fig. 7

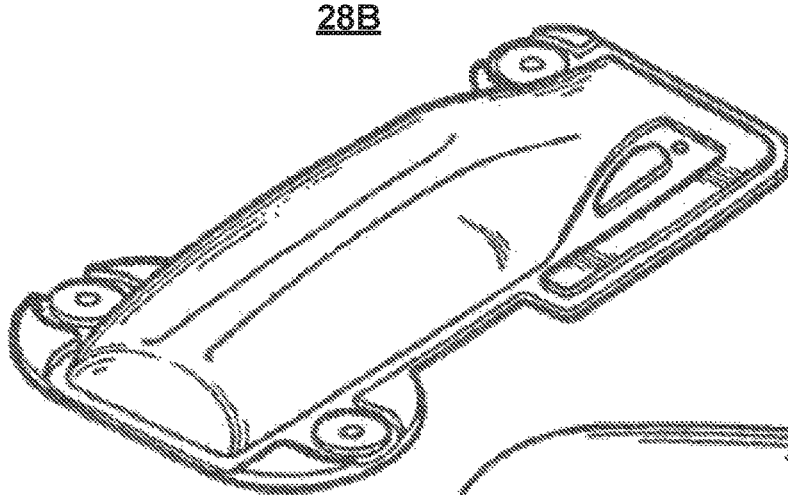
Fig. 8
Fig. 9
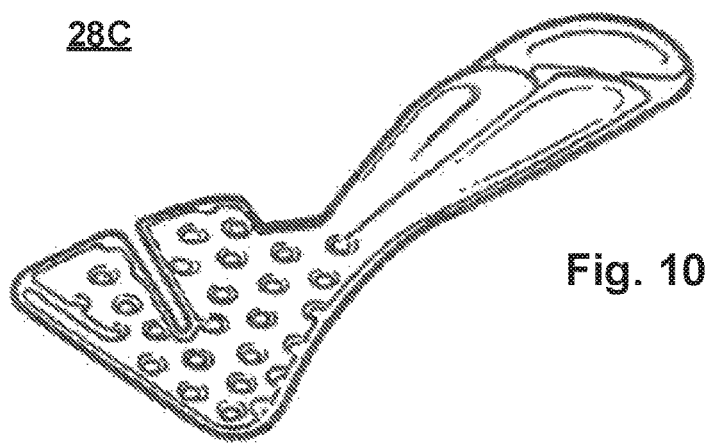
Fig. 10
Fig. 11
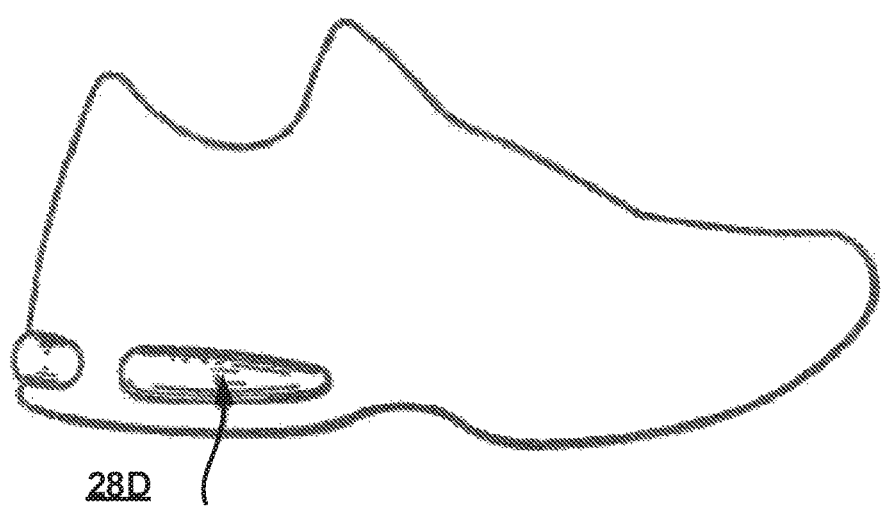

MULTI-LAYERED STRUCTURES AND USES THEREOF

CROSS-REFERENCE TO RELATED APPLICATIONS

This application is the 35 U.S.C. § 371 national stage application of PCT Application No. PCT/US2017-039087, filed Jun. 23, 2017, where the PCT claims priority to and the benefit of, U.S. Provisional Application Ser. No. 62/356,350, having the title "MULTI-LAYERED STRUCTURES AND USES THEREOF," filed on Jun. 29, 2016; U.S. Provisional Application Ser. No. 62/394,054, having the title "MULTI-LAYERED STRUCTURES AND USES THEREOF," filed on Sep. 13, 2016; and U.S. Provisional Application Ser. No. 62/467,551, having the title "MULTI-LAYERED STRUCTURES AND USES THEREOF," filed on Mar. 6, 2017, the disclosures of which are incorporated herein in by reference in their entireties.

FIELD

The disclosure relates to multi-layered structures, including multi-layered structures used in gas-filled bladders, cushioning devices, and vulcanized articles, such as vehicle tires.

BACKGROUND

Multi-layered structures having excellent fluid (gas or liquid) barrier properties are needed for constructing gas-filled bladders, cushioning devices, tires, and other structures. The multi-layered structures need to have low gas transmission rates for nitrogen or other gases. Thermoset and thermoplastic polymers are used in these applications because of their excellent flexibility. Thermoplastic polymers, including thermoplastic polyurethanes ("TPUs"), have desirable characteristics because their scraps can be reclaimed, melted or ground, and reused to produce new thermoplastic articles. Although thermoset materials sometimes lack the recyclability advantage, in some instances, they can be useful in achieving a well-balanced set of physical and mechanical properties for applications as footwear, sporting equipment, and vehicle tires.

BRIEF DESCRIPTION OF THE DRAWINGS

FIG. 4 is a fragmentary side perspective view of one embodiment of a tubular-shaped, two-layer cushioning device.

FIG. 5 is a sectional view taken along line 5-5 of FIG. 4.

FIG. 6 is a fragmentary side perspective view of a second embodiment of a tubular-shaped, three-layer cushioning device.

FIG. 7 is a sectional side view taken along line 7-7 of FIG. 6.

FIG. 8 is a perspective view of an alternative cushioning device embodiment.

FIG. 9 is a side view of the membrane illustrated in FIG. 8.

FIG. 10 is a perspective view of an alternative cushioning device embodiment.

FIG. 11 is a side elevational view of an athletic shoe having an alternative cushioning device embodiment.

DESCRIPTION

Figure 1:
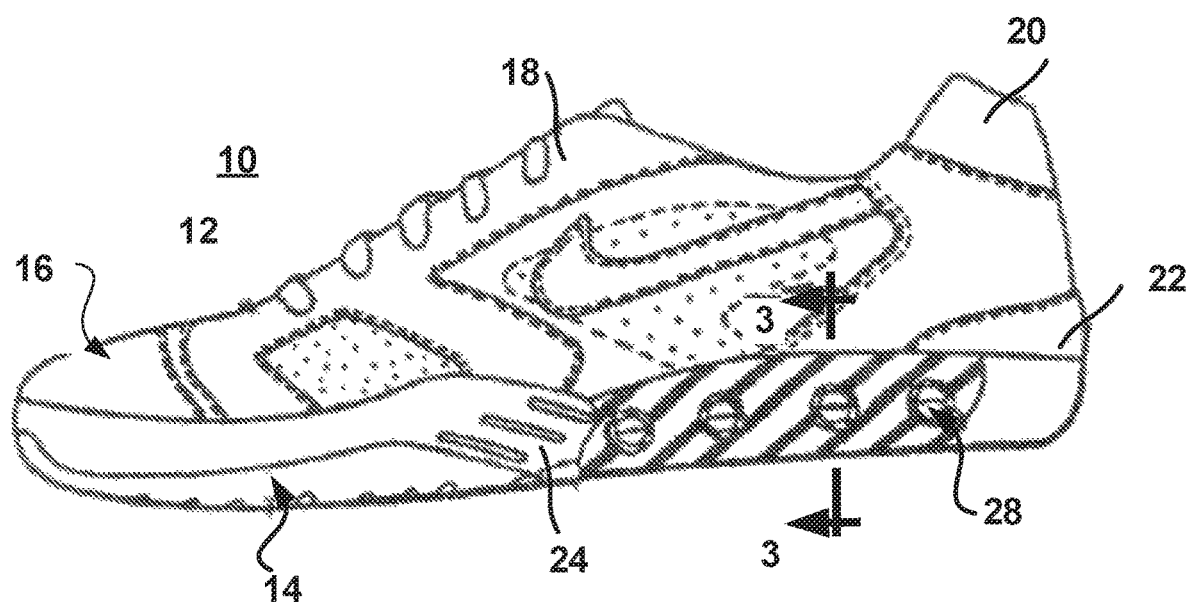
FIG. 1 is a side elevational view of an athletic shoe with a portion of the midsole cut-a-way to expose a cross-sectional view.
Figure 2:
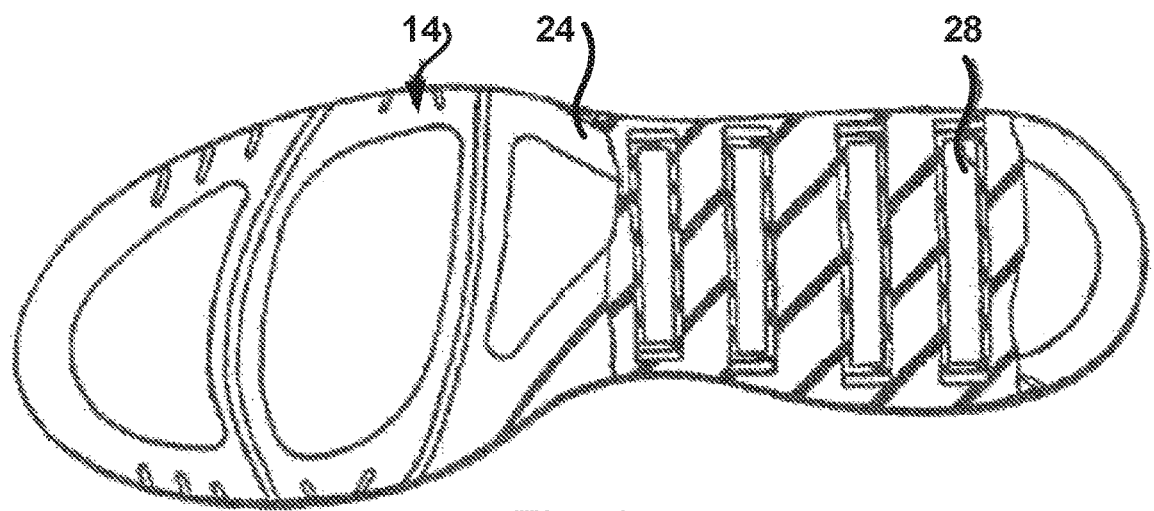
FIG. 2 is a bottom elevational view of the athletic shoe of FIG. 1 with a portion cut-a-way to expose another cross-sectional view.
Figure 3:
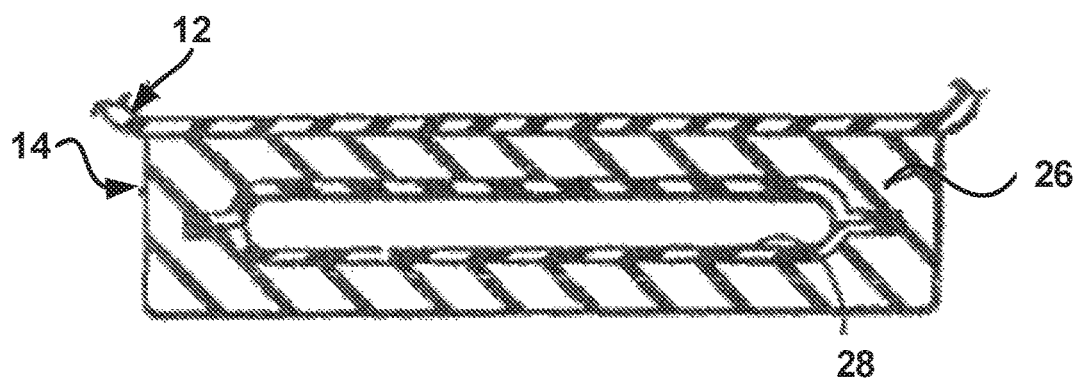
FIG. 3 is a section view taken along line 3-3 of FIG. 1.

Aspects of the present disclosure relate to a multi-layered structure. The multi-layered structure includes a core layer having a first side and a second side and a first cap layer having a cap layer first side and a cap layer second side. The first side of the first cap layer is in direct contact with the first side of the core layer. The first cap layer includes a blended material, where the blended material includes at least one thermoplastic material and at least one rubber compound. In an aspect, the rubber compound can be uncured or partially cured. In some examples, the cap layer can bond (e.g., covalently) to another layer (e.g., a rubber layer) that is adjacent and directly in contact with the first cap layer.

In some aspects, the multi-layered structure further includes a second cap layer having a second cap layer first side and a second cap layer second side. The second cap layer first side is in direct contact with the second side of the core layer. The second cap layer can comprise, consist essentially of, or consist of a thermoplastic material, as the term is defined herein. When the multi-layered structure further includes a second cap layer, the second cap layer can include the same or different thermoplastic material as that of the first cap layer.

In some aspects, the multi-layered structure includes a core layer including a multi-layer polymeric material. In some examples, the multi-layer polymeric material is a composite of alternating thermoplastic materials and barrier microlayers or layers of a first thermoplastic material and a second thermoplastic material, where a layer of the second thermoplastic material has a lower gas permeability than a layer of the first thermoplastic material. In some aspects, the layer of the second thermoplastic material has an average thickness of about 0.1 microns to about 50 microns. In some aspects, the multi-layer polymeric material includes ethylene-vinyl alcohol copolymer layers.

At least one of the first cap layer, the second cap layer (when present), and the core layer, can include at least one thermoplastic material. Examples of thermoplastic materials that can be used in the at least one of the first cap layer, the second cap layer (when present), and the core layer can include thermoplastic polyurethane (TPU), including olefinic TPU, such as a polydiene polyol-based TPU. The polydiene polyol-based TPU can be made from a polybutadiene polyol, a polyisoprene polyol, or a partially or fully hydrogenated derivative of a polybutadiene polyol or of a polyisoprene polyol, or any combination thereof. In other examples, the thermoplastic materials that can be used in the core layer and/or the cap layer include polyester-, polyether-, polycaprolactone-, polycarbonate- and polysiloxane-based TPU, ethylene-vinyl alcohol copolymers or combinations thereof. In some examples, at least one of the first side and the second side of the core layer include an olefinic TPU.

In some aspects, the olefinic TPU includes at least one hard segment and at least one soft segment. The olefinic TPU including at least one hard segment and at least one soft segment can have a hard segment content of about 20 wt. % to about 50 wt. % (e.g., about 25 wt. % to about 45 wt. %; about 30 wt. % to about 40 wt. %; or about 20 wt. % to about 40 wt. %). The olefinic TPU including at least one hard segment and at least one soft segment can have a soft segment content of about 50 wt. % to about 80 wt. % (e.g., about 50 wt. % to about 75 wt. %; about 60 wt. % to about 80 wt. %; or about 65 wt. % to about 80 wt. %). The olefinic TPU including at least one hard segment and at least one soft segment can have a hard segment content of about 20 wt. % to about 50 wt. %, and a soft segment content of about 50 wt. % to about 80 wt. %.

In some aspects, the soft segment comprises, consists essentially of or consists of soft segments derived from hydroxyl-terminated diols (e.g., poly-($C_1$-$C_6$)-hydroxyl-terminated diols), unsubstituted or substituted (where substituted includes replacement of one or more hydrogens with a halogen). In some embodiments, the soft segments are derived from hydroxyl-terminated diols that are based on homopolymers of butadiene. Non-limiting examples of soft segments are those derived from hydroxyl-terminated diols such as hydroxyl-terminated polybutadiene (HTPB) resins including hydroxyl-terminated polybutadiene resins sold under the KRASOL® trademark. These HTPB resins include Poly bd® R-45HTLO Resin, Poly bd® R-20LM Resin, Poly bd® 605E, Krasol® LBH 2000, Krasol® LBH 3000, Krasol® LBH-P 2000, Krasol® LBH-P 3000, Krasol® HLBH-P 2000, and Krasol® HLBH-P 3000.

Poly bd® R-45HTLO Resin has the general formula:

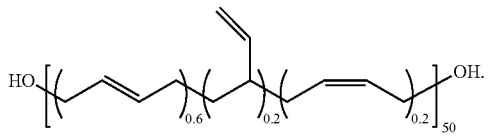

Poly bd® R-20LM Resin has the general formula:

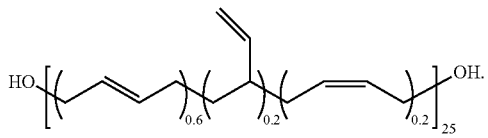

Poly bd® 605E has the general formula:

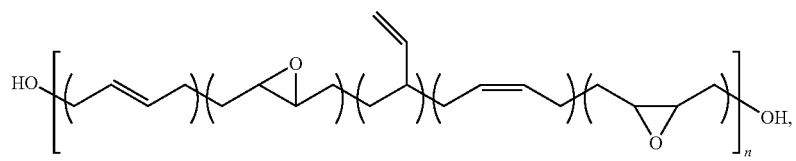

where n is an integer sufficient to give the resin a molecular weight ($M_n$) of about 1,300 g/mol.

The Krasol® LBH 2000 and Krasol® LBH 3000 series of resins are linear polybutadiene polymers with hydroxyl end groups having a molecular weight ($M_n$) of about 2,000 to about 3,000 g/mol. The Krasol® LBH-P 2000 and Krasol® LBH-P 3000, series of resins are linear polybutadiene polymers with primary hydroxyl end groups having a molecular weight ($M_n$) of about 2,000 to about 3,000 g/mol. The Krasol® HLBH-P 2000 and Krasol® HLBH-P 3000 are saturated aliphatic liquid polyols having a molecular weight ($M_n$) of about 2,000 to about 3,000 g/mol.

In some examples, the hard segment comprises, consists essentially of or consists of —($C_6$-$C_{18}$)-arylene-($C_1$-$C_6$)-alkylene-($C_6$-$C_{18}$)-arylene segments (e.g., —($C_6$-$C_{10}$)-arylene-($C_1$-$C_3$)-alkylene-($C_6$-$C_{10}$)-arylene segments; and -phenylene-methylene-phenylene segments), unsubstituted or substituted.

The term "($C_1$-$C_6$)alkylene" as used herein refers to straight chain and branched, saturated groups having 1 to 6 carbon atoms. Examples of straight chain ($C_1$-$C_6$)alkylene groups include those with 1 to 6 carbon atoms such as —$CH_2$—, —$CH_2CH_2$—, —$CH_2CH_2CH_2$—, —$CH_2CH_2CH_2CH_2$—, and —$CH_2CH_2CH_2CH_2CH_2$—. Examples of branched ($C_1$-$C_6$)alkylene groups include —$CH(CH_3)CH_2$— and —$CH_2CH(CH_3)CH_2$—), unsubstituted or substituted.

The term "($C_6$-$C_{18}$)arylene" as used herein refers to divalent groups that are derived by removing two hydrogen atoms from an arene, which is a cyclic aromatic hydrocarbon, having 6 to 18 carbon atoms, 10 to 18 carbon atoms, 12 to 18 carbon atoms, 6 to about 10 carbon atoms or 6 to 8 carbon atoms, unsubstituted or substituted. Examples of ($C_6$-$C_{18}$)arylene groups include:

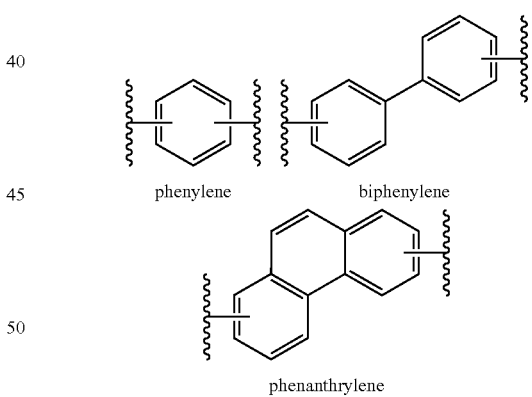

phenylene     biphenylene phenanthrylene where the wavy lines represent the points of attachment to, e.g., —($C_1$-$C_6$)-alkylene group. In some aspects, the multi-layered structure further includes structural layers. In some aspects, the structural layers can be formed of repurposed (e.g., ground or re-ground) polymeric materials, such as the thermoplastic materials described herein.

In some aspects, at least one of the first cap layer and the second cap layer (when present) includes a blended material including at least one thermoplastic material; and at least one rubber compound, which can be uncured or partially cured. In some aspects, at least one of the first cap layer and the second cap layer (when present) further includes at least one curing agent for the at least one rubber compound. In some aspects, the thermoplastic material can be in the blended material is an olefinic TPU, such as a polydiene polyol-based TPU.

In some aspects, the rubber compound, which can be uncured or partially cured, included in the blended material of the cap layer can be a natural rubber, a synthetic rubber, or a combination of both. Examples of rubber compounds that are contemplated herein include natural rubber, butyl rubber, neoprene rubber, nitrile rubber, isoprene rubber, butadiene rubber, styrene-butadiene rubber, ethylene propylene diene monomer (EPDM) rubber, ethylene-propylene rubber, urethane rubber or any combination thereof. In some examples, the rubber compound includes an isoprene rubber, a butyl rubber, a butadiene rubber, a styrene-butadiene rubber or any combination thereof. In some, more specific examples, the rubber compound includes styrene-butadiene rubber. Other examples of rubber compounds include, but are not limited to, elastomeric polymers, such as polyolefins, polynorbornene rubber, methyl methacrylate butadiene styrene rubber (MBS), styrene butadiene styrene rubber (SBS), styrene ethylene butylene (SEBS) rubber, silicone rubber, urethane rubber, and mixtures thereof. Still other examples of rubber compounds include elastomeric polymers, such as uncured rubber, including uncured natural rubber, uncured polyisoprene rubber, uncured butyl rubber, and the like.

In some aspects, the rubber compounds can further include fillers; process oils; and/or a curing package including at least one of crosslinking initiator(s), crosslinking accelerator(s), and crosslinking retarder(s). Examples of fillers include, but are not limited to, carbon black, silica, and talc. Examples of process oils include, but are not limited to, paraffin oil and/or aromatic oils. Examples of crosslinking initiators include, but are not limited to, sulfur or peroxide initiators such as di-t-amyl peroxide, di-t-butyl peroxide, t-butyl cumyl peroxide, di-cumyl peroxide (DCP), di(2-methyl-1-phenyl-2-propyl)peroxide, t-butyl 2-methyl-1-phenyl-2-propyl peroxide, di(t-buylperoxy)-diisopropylbenzene, 2,5-dimethyl-2,5-di(t-butylperoxy)hexane, 2,5-dimethyl-2,5-di(t-butylperoxy)hexpe-3,1,1-di(t-butylperoxy)-3,3,5-trimethylcyclohexane, 4,4-di(t-butylperoxy)-n-butylvalerate, and mixtures thereof. Examples of crosslinking accelerators include, but are not limited to, N-cyclohexyl-2-benzothiazole sulfenamide (CBZ), N-oxydiethylene-2-benzothiazole sulfenamide, N,N-diisopropyl-2-benzothiazole sulfenamide, 2-mercaptobenzothiazole, 2-(2,4-dinitrophenyl)mercaptobenzothiazole, 2-(2,6-diethyl-4-morpholinothio)benzothiazole and dibenzothiazyl disulfide; guanidine compounds, such as diphenylguanidine (DPG), triphenylguanidine, diorthonitrileguanidine, orthonitrile biguanide and diphenylguanidine phthalate; aldehyde amine compounds or aldehyde ammonia compounds, such as acetaldehyde-aniline reaction product, butylaldehyde-aniline condensate, hexamethylenetetramine and acetaldehyde ammonia; imidazoline compounds, such as 2-mercaptoimidazoline; thiourea compounds, such as thiocarbanilide, diethylthiourea, dibutylthiourea, trimethylthiourea and diorthotolylthiourea; thiuram compounds, such as tetramethylthiuram monosulfide, tetramethylthiuram disulfide, tetraethylthiuram disulfide, tetrabutylthiuram disulfide and pentamethylenethiuram tetrasulfide; dithioate compounds, such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium dimethyldithiocarbamate; xanthate compounds, such as zinc dibutylxanthogenate; and other compounds, such as zinc white. Examples of crosslinking retarders include, but are not limited to, alkoxyphenols, catechols, and benzoquinones, and alkoxyphenols such as 3,5-di-t-butyl-4-hydroxyanisol.

In some instances, the rubber compound includes at least some level of curing, but is generally at least partially cured. Or stated another way, the rubber compound can be at least partially cured.

As used herein, the term "partially cured" generally refers to a compound (e.g., a rubber compound) having a relatively low crosslink density of less than or equal to $10^{-3}$ moles/$cm^3$, or less than or equal to $10^{-5}$ moles $cm^3$. For example, the partially cured polymeric compound can have about 15 to about 1500 monomer units present between crosslinks. Dynamic mechanical analysis (DMA) can be used to determine the modulus plateau for the compound. In the region of the modulus plateau above the glass transition temperature of the compound and below the melting point of the compound, the crosslink density is directly proportional to the modulus of the compound.

As used herein, the term "cured" generally refers to a compound (e.g., a rubber compound) having a relatively high crosslink density. For example, the crosslink density of the cured compound can be at least 20% greater, or at least 30% greater, or at least 50% greater than the crosslink density of the uncured or partially cured compound.

Examples of crosslinking reactions (i.e., vulcanization reactions) include, but are not limited to, free-radical reactions, ionic reactions (both anionic and cationic), addition reactions, and metal salt reactions. Crosslinking reactions can be initiated by actinic radiation, including heat, UV, electron beam or other high energy sources.

In some aspects, the first cap layer includes a blended material, the blended material including at least one thermoplastic material and at least one uncured or partially cured rubber compound. In other aspects, the second cap layer (when present) includes a blended material, the blended material including at least one thermoplastic material and at least one uncured or partially cured rubber compound. In still other aspects, the first cap layer includes a blended material, the blended material including at least one thermoplastic material and at least one uncured or partially cured rubber compound, while the second cap layer (when present) includes a blended material, the blended material including at least one thermoplastic material and at least one partially cured rubber compound. In yet other aspects, the first cap layer includes a blended material, the blended material including at least one thermoplastic material and at least one partially cured rubber compound, while the second cap layer (when present) includes a blended material, the blended material including at least one thermoplastic material and at least one uncured or partially cured rubber compound.

In some aspects, at least one of the first cap layer and the second cap layer (when present) includes a blended material includes at least one curing agent for the at least one rubber compound. Examples of curing agents include sulfur-based (e.g., molecular sulfur) and peroxide-based curing agents (e.g., dicumyl peroxide, zinc peroxide, benzoyl peroxide, 2,4-chlorobenzoyl peroxide, 2,5-bis(t-butylperoxy)-2,5-dimethylhexane, and the like). These curing agents can be dissolved, suspended or otherwise dispersed in the blended material. The curing agents can be dissolved, suspended or otherwise dispersed throughout the blended material or in a portion of the blended material. When the curing agents are activated (e.g., by using heat or any other suitable form of radiation that effects activation of the curing agents), they effect chemical reactions that, in some examples, cause the cap layer to "cure to" (e.g., form covalent bonds with) the layer that is adjacent and directly in contact with at least one of the first cap layer and the second cap layer (when present) (e.g., the core layer), thereby bonding at least one of the first cap layer and the second cap layer (when present) to another layer that is adjacent and directly in contact with at least one of the first cap layer and the second cap layer (when present) (e.g., bonding the core layer to a first cap layer). The "chemical reactions" include, but are not limited to, cross-linking reactions (e.g., vulcanization) between the surfaces of the bulk material that makes up at least one of the first cap layer and the second cap layer (when present) and the surface of a layer that is adjacent and directly in contact with at least one of the first cap layer and the second cap layer (when present).

In some examples, at least one of the first cap layer and the second cap layer (when present) includes a blended material including a vulcanization accelerator (e.g., 0.1 to 15 wt. % of the blended material). Examples of vulcanization accelerators include guanidine compounds, sulfenamide compounds, thiazole compounds, thiuram compounds, thio-urea compounds, dithiocarbamic acid compounds, aldehyde-amine compounds, aldehyde-ammonia compounds, imidazoline compounds and xanthate compounds. Examples of the guanidine compounds include 1,3-diphenylguanidine; examples of the sulfenamide compounds include N-(tert-butyl)-2-benzothiazolesulfenamide and N-cyclohexyl-2-benzothiazolyl sulfenamide; examples of the thiuram compounds include tetrabutylthiuram disulfide. These compounds may be used individually or two or more of them may be used in combination.

In some aspects, the cap layer includes a blended material including a vulcanization aid (e.g., about 0.1 to 15 wt. % of the blended material). Examples of vulcanization aids include aliphatic acids such as stearic acid; metal oxides such as zinc oxide; and metal salts of aliphatic acids such as zinc stearate. These compounds may be used individually or two or more of them may be used in combination.

In some aspects, at least one of the first cap layer and the second cap layer (when present) further includes a tackifier. Examples of suitable tackifiers include rosins such as "FORAL 85", a stabilized rosin ester from Hercules, Inc., the "SNOWTACK" series of gum rosins from Tenneco, and the "AQUATAC" series of tall oil rosins from Sylvachem; and synthetic hydrocarbon resins such as the "PICCOLYTE A" series, polyterpenes from Hercules, Inc., the "ESCOREZ 1300" series of C5 aliphatic olefin-derived resins, the "ESCOREZ 2000" Series of C9 aromatic/aliphatic olefin-derived resins, and polyaromatic C9 resins, such as the "PICCO 5000" series of aromatic hydrocarbon resins, from Hercules, Inc. The tackifier, when present, can be present in an amount of less than about 40 wt. % of the blended material (e.g., less than about 35 wt. %; less than about 30 wt. %; less than about 25 wt. %; less than about 20 wt. %; less than about 15 wt. %; less than about 10 wt. %; less than about 5 wt. %; less than about 1 wt. %; about 0.1 wt. % to about 35 wt. %; about 0.1 wt. % to about 10 wt. %; about 1 wt. % to about 5 wt. %; or about 0.1 wt. % to about 1 wt. %).

In some aspects, at least one of the first cap layer and the second cap layer (when present) includes about 20 wt. % to about 80 wt. % of the blended material (e.g., from about 25 wt. % to about 50 wt. %; about 30 wt. % to about 70 wt. %; about 30 wt. % to about 75 wt. %; or about 50 wt. % to about 80 wt. %) of the at least one thermoplastic material; and from about 20 wt. % to about 80 wt. % of the blended material (e.g., from about 25 wt. % to about 50 wt. %; from about 30 wt. % to about 70 wt. %; about 30 wt. % to about 75 wt. %; or about 50 wt. % to about 80 wt. %) of the at least one rubber compound. It should be understood that the blend can include additional components, such that the wt. % amounts of the at least one thermoplastic material and of the at least one rubber compound will not add up to 100%. Thus, for example, at least one of the first cap layer and the second cap layer (when present) can further include at least one curing agent in an amount less than about 2 wt. % of the at least one curing agent, such that the wt. % amounts of the at least one thermoplastic material and of the at least one rubber compound can be about 98 wt. % of the blended material or higher (e.g., about 100 wt. %).

In some aspects, the multi-layered structure further includes at least one of a first release layer in direct contact with the second side of the first cap layer. In other aspects, the multi-layered structure further includes a second release layer in direct contact with the second side of the second cap layer. The first release layer and the second release layer, when one or both is present, can be made of any suitable material and can be made of the same or a different material. In some examples, the first release layer and the second release layer, when one or both is present, can be made of at least one material selected from a polyalkylene or a polyalkylene terephthalate. Examples of polyalkylenes include methyl-pentene copolymer, polyethylene, polypropylene, polyethylene terephthalate, polybutylene terephthalate, polyethylene naphthalate, polybutylene naphthalate, nylon 6, nylon 66 or a nylon 6/66 copolymer.

In some aspects, the first release layer or the second release layer can serve to protect the cap layers from among other things, against damage from a vulcanization process that is applied to a green tire, when the multi-layered structures described herein are used as components for tires.

In an aspect, the thickness of the first release layer and the second release layer may be varied within a relatively wide range. The first release layer and the second release layer can be prepared using methods well known in the art. For example, at least one of the first release layer and the second release layer can be extruded in a blown film process. In some examples, at least one of the first release layer and the second release layer have a thickness of about 1000 μm or less (e.g., about 500 μm or less; about 250 μm or less; about 100 μm or less; 10 μm or less; from about 1 μm to about 1000 μm; about 100 μm to about 750 μm or about 10 μm to about 1000 μm).

In some aspects, at least one of the first release layer and the second release layer are polymeric films that at least partially cover the first cap layer and the second cap layer, respectively. In some examples, at least one of the first release layer and the second release layer completely cover at least one of the first cap layer and the second cap layer, respectively. The disclosure also relates to a method for manufacturing a multi-layered structure. The method includes laminating or co-extruding a core layer with a first cap layer. The core layer has a first side and a second side.

The first cap layer has a cap layer first side and a cap layer second side, the first side of the first cap layer being in direct contact with the first side of the core layer. The first cap layer includes a blended material including at least one thermoplastic material; and the at least one rubber compound. In some examples, the blended material further includes at least one curing agent for the at least one rubber compound.

Benefits of a method including co-extruding a core layer with a first cap layer include, but are not limited to, production of a thin cap layer, relative to other methods described herein; production of a more consistent gauge for the co-extruded core layer and cap layer, relative to other methods described herein; more sophisticated extrusion on core, relative to other methods described herein; and reduction of the labor-intensiveness of the process relative to other methods described herein. These methods also generally produce good adhesion between the cap layer and the core.

In some examples, a method for manufacturing a multi-layered structure further includes laminating or co-extruding a core layer with a first cap layer and a second cap layer. The core layer has a first side and a second side. The first cap layer has a cap layer first side and a cap layer second side, the first side of the first cap layer being in direct contact with the first side of the core layer. The second cap layer has a second cap layer first side and a second cap layer second side, the first side of the second cap layer being in direct contact with the second side of the core layer.

In an aspect, the method including laminating or co-extruding a core layer with a first cap layer and a second cap layer can be advantageous for one or more of the following: allowing for the substantially simultaneous application of the first and second cap layers onto the formed core, even though such a method may require specialized equipment or the "scrapping" of some startup materials. Other possible advantages of a method including laminating or co-extruding a core layer with a first cap layer and a second cap layer include, but are not limited to, is that, if the first and second cap layers are applied in a substantially sequential manner onto the core, the method becomes less capital-intensive, relative to other methods described herein, as it would use standard equipment, even though such method may require the scrapping of startup materials or can be more labor-intensive, relative to other methods described herein. These methods also typically produce good adhesion between the cap layers and the core.

In some aspects, a method for manufacturing a multi-layered structure further includes applying at least one of a first release layer in direct contact with the second side of the first cap layer. In other examples, a method for manufacturing a multi-layered structure further includes applying a second release layer in direct contact with the second side of the second cap layer.

In some aspects, the method includes co-extruding alternating barrier and TPU microlayers to form a core layer including a composite of the microlayers. At least one cap layer is co-extruded with the core layer. Alternatively, at least one cap layer is laminated onto the core layer first side and second side.

In some aspects, a method for manufacturing a multi-layered structure includes extruding the core layer, the core layer having the first side and the second side; and laminating or transfer-coating the first cap layer onto the core layer, the first cap layer having the cap layer first side and the cap layer second side, the first side of the first cap layer being in direct contact with the first side of the core layer. In an aspect, the first cap layer includes the blended material including at least one thermoplastic material; and at least one rubber compound. In some aspects, the method further includes applying a first release layer in direct contact with the second side of the first cap layer. In other examples, the method further includes laminating or transfer-coating a second cap layer having a second cap layer first side and a second cap layer second side, onto the core layer, the first side being in direct contact with the second side of the core layer. In an aspect, the laminating or transfer-coating of the second cap layer is after the laminating or transfer-coating of the first cap layer. In still other examples, the method further includes laminating or transfer-coating a second cap layer having a second cap layer first side and a second cap layer second side, onto the core layer, the first side being in direct contact with the second side of the core layer. In an aspect, the laminating or transfer-coating of the second cap layer is substantially at the same time as the laminating of the first cap layer. In yet other aspects, the method further includes applying a second release layer in direct contact with the second side of the second cap layer.

Aspects of the disclosure also relates to a method for manufacturing a vulcanized article (e.g., a vehicle tire). The method includes placing a cap layer of a multi-layered structure in direct contact with a portion of uncured or partially cured rubber to form a layered article; and exposing the layered article to a condition effective to vulcanize at least the portion of the rubber in direct contact with the cap layer to produce the vulcanized article. In an aspect, the cap layer includes a blended material including at least one thermoplastic material and at least one uncured or partially cured rubber compound.

In some aspects, the placing includes placing the multi-layered structure and the uncured rubber in a mold. In some aspects, the exposing is conducted in the mold. The method for manufacturing a vulcanized article can further include removing the vulcanized article from the mold after exposing the layered article. In some examples, the cap layer includes a blended material including at least one thermoplastic material; and at least one uncured or partially cured rubber compound. And in other examples, the blended material further includes at least one curing agent for the at least one uncured or partially cured rubber compound.

Aspects of the disclosure also relate to a vulcanized article including: a multi-layered structure including a layer having a first side and a second side; the layer including a blend of a thermoplastic polymer and a vulcanized rubber; the layer being bonded on the first side to a thermoplastic polymer substrate, and on the second side to a vulcanized rubber substrate.

Multi-layered structures of the disclosure are valuable for constructing, among other things, inflated structures such as gas-filled bladders or cushioning devices (e.g., for automobiles and trucks, such as pneumatic shock absorbers) having good moisture resistance and very low gas transmission rates. The disclosure includes articles of manufacture that utilize the multi-layered structures and inflated structures, such as shoes, skates, balls, tires, bicycle seats, saddles, personal protective articles, flexible and rigid flotation devices, medical, prosthetic, and orthopedic devices, accumulators, and articles of furniture.

Aspects of the disclosure also include articles of manufacture that utilize the multi-layered structures described herein in fluid conduits, including hoses, such as fuel- or air-line hoses. Fuel-line hoses suffer, among other things, gasoline and alcohol permeation regardless of the type of rubber used. The multi-layered structures of the disclosure described herein, which, in some instances employ alternating TPU and barrier microlayers exhibits outstanding barrier properties for the fuel and the gases associated with fuel, such as automobile fuel. Thus, for example, the multi-layered structure including a core layer and a first cap layer including a blended material including at least one thermoplastic material and at least one rubber compound can be coextruded in the form of a hose. And a layer of rubber can be placed in direct contact with the cap layer, substantially covering the entire cap layer. The rubber layer can then be cured to the cap layer to obtain a hose that can be used for, among other things, fuel-lines.

In some examples, the multi-layered structures of the various examples of the present disclosure have at least excellent resistance to fatigue failure. A multi-layered structure resists fatigue failure when, for example, it can undergo repeated flexing and/or deformation and substantially recover without delamination along the layer interfaces or without creating a crack that runs through the thickness of the multi-layered structure, preferably over a broad range of temperatures.

As used herein, "multi-layered structure" generally refers to a free-standing film separating one fluid (whether liquid or gas) from another fluid. Films laminated or painted onto another article for purposes other than separating fluids are excluded from this definition of multi-layered structure. A multi-layered structure is normally a multilayer, composite structure made up of many polymeric microlayers.

"Core layer" refers to an inner layer or layers, sometimes the innermost layer or layers, in a multi-layer structure. The core layer includes a composite of alternating TPU and barrier microlayers. By "microlayer," it is meant an individual layer of TPU or barrier material having a thickness of a few nanometers to several mils (about 100 microns). In some examples, the individual microlayers will have an average thickness up to about 0.1 mil (about 2.5 microns). The individual microlayers can have average thicknesses of about 0.0004 mil (about 0.01 micron) to about 0.1 mil (about 2.5 microns). Individual barrier material layers of about 0.05 mils (about 1.2 microns) may be desirable, as thin barrier layers can help to provide ductile multi-layered structures.

In an aspect, the core layer can include many alternating microlayers. The core layer can be a polymeric composite having at least about 10 layers, or at least about 20 layers, or at least about 50 layers. The core layer can have thousands of microlayers, and the skilled artisan will appreciate that the number of microlayers can depend upon such factors as the particular materials chosen, thicknesses of each layer, the thickness of the core layer, the processing conditions, and the intended use of the core layer. In one aspect, the core layer can include about 10 to about 1000 microlayers, or about 30 to about 1000 microlayers, or about 50 to about 500 layers.

Suitable polydiene polyol-based TPUs used in at least one of the first cap layer, the second cap layer (when present), and the core layer can be made by reacting a polydiene polyol, a polyisocyanate, and, in some examples, a chain extender. In some cases, the polydiene polyol-based TPU may be available commercially. However, the TPUs can be made and customized for a particular purpose. The TPUs can be made using a prepolymer approach in which the polyisocyanate and polydiene polyol are pre-reacted to form an NCO-terminated intermediate, followed by a subsequent reaction with a chain extender to generate the high polymer. A "one shot" technique, in which the polydiene polyol, polyisocyanate, and chain extender are reacted in one step, can also be used. The "one shot" and prepolymer techniques are well known in the polyurethane art.

The polydiene polyol-based TPUs can be linear and thus the polyisocyanate component can be substantially di-functional. Suitable diisocyanates used to prepare the TPUs can be well known aromatic, aliphatic, and cycloaliphatic diisocyanates. Examples include diphenylmethane diisocyanate (MDI), polymeric MDIs (PMDI), isophorone diisocyanate (IRDI), hydrogenated MDIs (e.g., H12MDI), cyclohexyl diisocyanate (CHDI), tetramethylxylylene diisocyanates (TMXDI), 1,6-hexamethylene diisocyanate (HDI), 1,4-butylene diisocyanate, lysine diisocyanate, toluene diisocyanates, xylylenediisocyanates (XDI), hydrogenated XDIs (e.g., H6XDI), p-phenylene diisocyanate, napththalene diisocyanates (NDI), 4-chloro-1,3-phenylene diisocyanate, 1,5-tetrahydronaphthalene diisocyanate, 4,4'-dibenzyl diisocyanate, and the like, and combinations thereof. MDI and polymeric MDIs can be used.

Suitable chain extenders for use in making the polydiene polyol-based TPUs are also well known. In general, the chain extenders can have at least two, or exactly two, active hydrogen groups. Examples include low-molecular-weight diols, dithiols, diamines, or compounds having a mixture of hydroxyl, thiol, and amine groups, such as alkanolamines, aminoalkyl mercaptans, and hydroxyalkyl mercaptans, among others. The molecular weight of the chain extender can be about 60 to about 400. Alcohols and amines can be used. Suitable diol chain extenders include, for example, 1,6-hexanediol, 1,4-cyclohexanedimethanol, 2-ethyl-1,6-hexanediol, 1,4-butanediol, ethylene glycol, lower oligomers of ethylene glycol (e.g., diethylene glycol, triethylene glycol, and tetraethylene glycol), propylene glycol, lower oligomers of propylene glycol (e.g., dipropylene glycol, tripropylene glycol, and tetrapropylene glycol), 1,3-propanediol, 2-methyl-1,3-propanediol, neopentyl glycol, dihydroxyalkylated aromatic compounds (e.g., bis(2-hydroxyethyl) ethers of hydroquinone and resorcinol, xylene-α,α-diols and their bis(2-hydroxyethyl) ethers), and mixtures thereof. Suitable diamine chain extenders include, for example, p-phenylenediamine, m-phenylenediamine, benzidine, 4,4'-methylenedianiline, 4,4'-methylenebis(2-chloroaniline), ethylene diamine, and combinations of these. Other typical chain extenders are amino alcohols such as ethanolamine, propanolamine, butanolamine, and combinations of these. Examples of chain extenders include ethylene glycol, diethylene glycol, triethylene glycol, tetraethylene glycol, propylene glycol, dipropylene glycol, tripropylene glycol, tetrapropylene glycol, 1,3-propylene glycol, 1,4-butanediol, 1,6-hexanediol, and combinations of these. A minor proportion of mono- or trifunctional material (e.g., glycerin or trimethylolpropane) may be present along with the difunctional chain extender to adjust reactivity or modify properties of the polydiene polyol-based TPU.

Polydiene polyols suitable for use in making polydiene polyol-based TPUs are well known, and many are available commercially. The polydiene polyols can have an average hydroxyl functionality of 1.7 to 2.5. Polydiene diols having an average hydroxyl functionality of 1.8 to 2.1 can be used. Polydiene diols having an average hydroxyl functionality of from 1.9 to 2.0 can be used.

Suitable polydiene polyols are hydroxyl-terminated polydienes. Examples include polybutadiene polyols, polyisoprene polyols, and the like. The polyols can be partially or fully hydrogenated. Polybutadiene polyols, including polybutadiene diols, can be used. Suitable polydiene polyols are available commercially from Cray Valley Hydrocarbon Specialty Chemicals, a brand of Total, under the Krasol® and Poly bd® trademarks. Examples include Krasol® LBH 2000 and Krasol® LBH 3000, which have secondary hydroxyl groups, and Krasol® LBH-P 2000 and Krasol® LBH-P 3000, which have primary hydroxyl groups. Hydrogenated products include Krasol® HLBH-P 2000 and Krasol® HLBH-P 3000. Other suitable commercial products include Poly bd® R-45HTLO, Poly bed R-45V, Poly bd® R-20LM, and Poly bd® R-45M.

In some aspects, the polydiene polyol is unsaturated or at least partially unsaturated. The polydiene polyols can have an iodine value of 50 to 500 g/100 g, or 200 to 450 g/100 g.

In other aspects, the polydiene polyol has a hydroxyl number of 11 to 560 mg KOH/g. The polydiene polyol can have a hydroxyl number of 28 to 250 mg KOH/g. The polydiene polyol can have a hydroxyl number of 28 to 112 mg KOH/g.

In some aspects, the polydiene polyol-based TPU is made from a polybutadiene polyol, a polyisoprene polyol, or a partially or fully hydrogenated derivative of a polybutadiene polyol or a polyisoprene polyol.

Other TPUs can be used for the core layer or any structural layer provided that a polydiene polyol-based TPU is used in at least one TPU cap layer. Thus, in some aspects, TPU microlayers of the core layer can be made using conventional polyether polyols, polyester polyols, polycarbonate polyols, polycaprolactone polyols, or any combination thereof. Polyether diols, polyester diols, and polycarbonate diols can be used. TPUs based on polyester diols can be used, and may adhere particularly well to barrier layers in some examples. Suitable conventional polyols are well known and include polytetrahydrofurans, polycaprolactones, polyethers from propylene oxide, ethylene oxide, or their combinations, polyethylene adipate, polybutylene succinate, and the like. For examples of suitable conventional polyether, polyester, and polycarbonate polyols, see U.S. Pat. No. 6,582,786, the teachings of which are incorporated herein by reference.

In some examples, the core layer also includes barrier microlayers. Suitable materials for these barrier microlayers include, for example, ethylene-vinyl alcohol copolymers (EVOH), poly(vinyl chloride), polyvinylidene polymers and copolymers (e.g., polyvinylidene chloride), polyamides (e.g., amorphous polyamides), acrylonitrile polymers (e.g., acrylonitrile-methyl acrylate copolymers), polyurethane engineering plastics, polymethylpentene resins, ethylene-carbon monoxide copolymers, liquid crystal polymers, polyethylene terephthalate, polyether imides, polyacrylic imides, and other polymeric materials known to have relatively low gas transmission rates. Blends and alloys of these materials, including combinations of polyimides and crystalline polymers, are also suitable. For instance, blends of polyimides and liquid crystal polymers, blends of polyamides and polyethylene terephthalate, and blends of polyamides with styrenics are suitable. In one aspect, the core layer includes barrier microlayers of an ethylene-vinyl alcohol (EVOH) copolymer. The EVOH copolymer can be a copolymer in which the ethylene content of the copolymer of about 25 mole percent to about 50 mole percent, or about 25 mole percent to about 40 mole percent. Ethylene-vinyl alcohol copolymers can be prepared by fully hydrolyzing ethylene-vinyl acetate copolymers. The core layer may include different barrier materials as blends or as discrete layers.

Specific examples of suitable barrier layer materials include acrylonitrile copolymers such as Barex® resins, available from Ineos; polyurethane engineering plastics such as Isoplast® ETPU available from Lubrizol; ethylene-vinyl alcohol copolymers marketed under the trademarks Eval™ by Kuraray, Soarnol™ by Nippon Gohsei, and Selar® OH by DuPont; polyvinylidiene chloride available from Dow Chemical under the tradename Saran™, and from Solvay under the tradename Ixan®; liquid crystal polymers such as Vectra® from Celanese and Xydar® from Solvay; MDX6 nylon, and amorphous nylons such as Novamid® X21 from DSM, Selar® PA from DuPont; polyetherimides sold under the tradename Ultem® by SABIC; poly(vinyl alcohol)s; and polymethylpentene resins available from Mitsui Chemicals under the TPX® mark. Commercially available copolymers of ethylene and vinyl alcohol, such as those available from Kuraray, can have an average ethylene content of about 25 mol % to about 48 mol %.

B. The Cap, Structural, and Rubber Layers

As noted above, the multi-layered structure optionally includes at least one TPU structural layer. Such structural layers need not include microlayers. The structural layer may include, but need not include, a polydiene polyol-based TPU. In some examples, the optional at least one structural layer, when present, includes a TPU made from a polyester polyol, a polyether polyol, a polycarbonate polyol, a polycaprolactone polyol, or any combination thereof. In some aspects, the optional at least one structural layer, when present, includes a TPU made from a polydiene polyol-based TPU.

Aspects of the disclosure also relates to inflated structures such as gas-filled bladders, cushioning devices, impact arrestors, and substantially closed containers made using the multi-layered structures described herein. In general, the inflated structures have good moisture resistance and very low gas transmission rates. The inflated structure can have a gas transmission rate for nitrogen gas, for example, wherein a multi-layered structure of a given thickness has a gas transmission rate for nitrogen that is at least about ten times lower than the gas transmission rate for nitrogen of a butyl rubber layer of substantially the same thickness as the thickness of the multi-layered structure. In some examples, the inflated structure can have a gas transmission rate (GTR) for nitrogen gas of less than about 10 cm$^3$/m$^2$·atm·day, or of less than about 5 cm$^3$/m$^2$·atm·day, or of less than about 1 cm$^3$/m$^2$·atm·day; e.g., from about 0.001 cm$^3$/m$^2$·atm·day to about 1 cm$^3$/m$^2$·atm·day, about 0.01 cm$^3$/m$^2$·atm·day to about 1 cm$^3$/m$^2$·atm·day or about 0.1 cm$^3$/m$^2$·atm·day to about 1 cm$^3$/m$^2$·atm·day. An accepted method for measuring the relative permeance, permeability, and diffusion of inflated structures is ASTM D-1434-82-V. See, e.g., U.S. Pat. No. 6,127,026, which is incorporated by reference as if fully set forth herein. According to ASTM D-1434-82-V, permeance, permeability and diffusion are measured by the following formulae:

Permeance (quantity of gas)/[(area)×(time)×(pressure difference)]=permeance (GTR)/(pressure difference)=cm$^3$/m$^2$·atm·day (i.e., 24 hours)

Permeability

[(quantity of gas)×(film thickness)][(area)×(time)× (pressure difference)]=permeability

[(GTR)×(film thickness)]/(pressure difference)= [(cm$^3$)(mil)]/m$^2$·atm·day (i.e., 24 hours)

Diffusion at one atmosphere (quantity of gas)/[(area)×(time)]=GTR=cm$^3$/m$^2$·day (i.e., 24 hours)

The inflated structures can have a moisture content of 1 to 50 ppm when equilibrated for 24 h at 30° C. with a relative humidity of 50%; or the structures can have a moisture content of 1 to 25 ppm when equilibrated for 24 h at 30° C.

with a relative humidity of 50%; or the structures can have a moisture content of 1 to 10 ppm when equilibrated for 24 h at 30° C. with a relative humidity of 50%.

In some examples, the peel strength of at least one of the first cap layer and the second first cap layer in the multi-layered structures described herein and a thermoplastic polyurethane (TPU) substrate in direct contact with the second side of the first cap layer or the second side of the second cap layer is from about 2 N/mm to about 6 N/mm as determined using ASTM method D902-98 (2010). In other examples, the peel strength of at least one of the first cap layer and the second first cap layer in the multi-layered structures described herein and an uncured rubber substrate in direct contact with the second side of the first cap layer or the second side of the second cap layer is from about 1 N/mm to about 3 N/mm as determined using ASTM method D902-98 (2010).

The multi-layered structures of the present disclosure can be formed by various processing techniques including, for example, extrusion, blow molding, injection molding, vacuum molding, rotary molding, transfer molding, pressure forming, heat sealing, casting, low-pressure casting, spin casting, reaction injection molding, radio frequency (RF) welding, and the like. Multilayer structures are conveniently made by co-extrusion followed by heat sealing or welding to give a highly flexible, inflatable multi-layered structure. The multi-layered structures are formed into sheets, bladders, substantially closed containers, cushioning devices, accumulators, impact arrestors, and similar structures. In this context, a "substantially closed" container is one that has a low or very low gas transmission rate. Such containers may be designed with a one-way valve or similar construction that allows a fluid (gas or liquid) to enter the container easily but is effective in preventing the fluid from escaping the container. Bladders may be permanently inflated or they may be substantially closed and take advantage of "diffusion pumping" using the one-way valve concept. Techniques for generating and dying multilayer structures have been described elsewhere (see, e.g., U.S. Pat. Nos. 5,713,141; 6,582,786; 6,652,940; 7,851,036, the teachings of which are incorporated herein by reference).

The multi-layered structures have tensile properties that reflect good strength and resilience. In particular, the multi-layered structures can have at least one of the following characteristics: (1) a tensile strength of at least about 2000 psi, or of at least about 3000 psi; (2) a 100% tensile modulus of 350 to 3000 psi; (3) an elongation of at least 200%, or of 200% to 700%.

III. Detailed description of the drawings

FIGS. 1-5 show an athletic shoe including a sole structure and a cushioning device fabricated from a multi-layered structure of the disclosure. The shoe 10 includes a shoe upper 12 to which the sole 14 is attached. The shoe upper 12 can be formed from a variety of conventional materials including, e.g., leathers, vinyls, nylons and other generally woven fibrous materials. Typically, the shoe upper 12 includes reinforcements located around the toe 16, the lacing eyelets 18, the top of the shoe 20 and along the heel area 22. As with most athletic shoes, the sole 14 extends generally the entire length of the shoe 10 from the toe region 16 through the arch region 24 and back to the heel portion 22.

The sole 14 includes one or more multi-layered structures 28 disposed in the mid-sole 26 of the sole structure. The multi-layered structures 28 can be formed having various geometries such as a plurality of tubular members positioned in a spaced apart, parallel relationship to each other within the heel region 22 of the mid-sole 26. The tubular members 28 are sealed inflatable multi-layered structures containing an injected captive gas. More specifically, each of the multi-layered structures 28 is formed to include a TPU cap layer and a core layer including alternating TPU and barrier layers. The core layer resists or prevents diffusion of the captive gases. The cap layer, and optionally the core layer, include a polydiene polyol-based TPU.

FIGS. 4 and 5 illustrate one multi-layered structure configuration within the disclosure. Multi-layered structure 28 can have an A-B composite structure including a cap layer 32 formed of a flexible resilient elastomeric material such as a TPU that can resist expansion beyond a predetermined maximum volume for the multi-layered structure when subjected to gaseous pressure. Multi-layered structure 28 also includes a core layer 30, which is a composite including alternating TPU and barrier microlayers. The cap layer of multi-layered structure 28, and optionally the core layer, include a polydiene polyol-based TPU.

FIGS. 6 and 7 illustrate another multi-layered structure configuration within the disclosure. Multi-layered structure 28A can have an A-B-A composite structure that includes two cap layers, inner cap layer 34 and outer cap layer 32, formed of a flexible resilient elastomeric material such as a TPU that can resist expansion beyond a predetermined maximum volume for the multi-layered structure when subjected to gaseous pressure. Multi-layered structure 28A also includes a core layer 30, which is a composite including alternating TPU and barrier microlayers. At least one of the cap layers of multi-layered structure 28A, and optionally the core layer, include a polydiene polyol-based TPU.

In one aspect, cushioning devices are fabricated from multi-layered extruded tubes. Lengths of the coextruded tubing ranging from one foot to coils of up to 5 feet, are inflated to a desired initial inflation pressure ranging from 0 psi ambient to 100 psi, or in the range of 5 to 50 psi, with the captive gas being an inert gas such as, for example, nitrogen. Sections of the tubing are RF welded or heat sealed to the desired lengths. The individual cushioning devices produced are then separated by cutting through the welded areas between adjacent cushioning devices. FIGS. 1-7 illustrate cushioning devices that can be fabricated using such a co-extrusion technique. Cushioning devices can also be fabricated with so-called "lay flat" extruded tubing whereby the internal geometry is welded into the tube.

Cushioning devices can also be made using blow molding. In one suitable blow molding approach, sheets or films of coextruded multilayer films are first formed. Two sheets of the multi-layer film are placed on top of each other and welded together along selected points using conventional heat sealing techniques or RF welding techniques. The uninflated bladder is then inflated through a formed inflation port to the desired initial inflation pressure. FIGS. 8-10 illustrate cushioning devices made using this approach.

Figure 12:
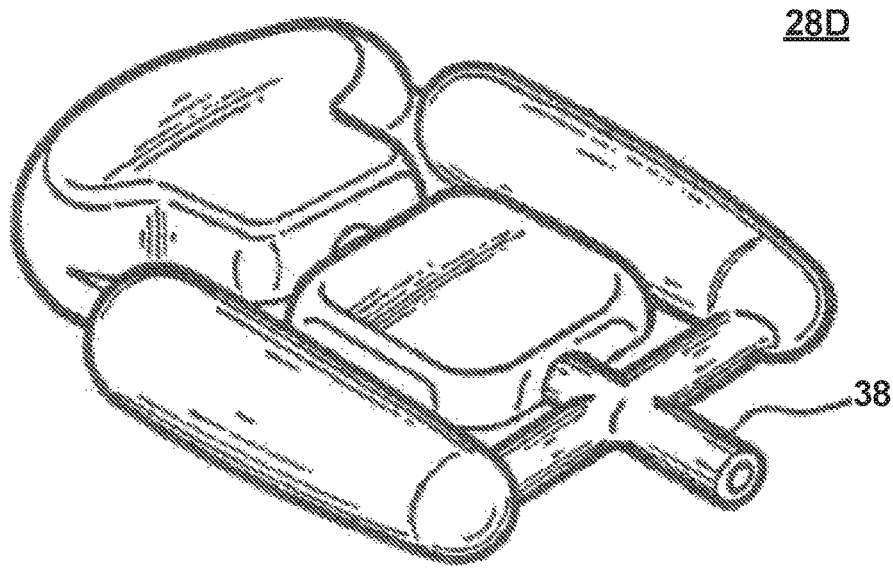
FIG. 12 is a perspective view of the cushioning device illustrated in FIG. 11.
Figure 13:
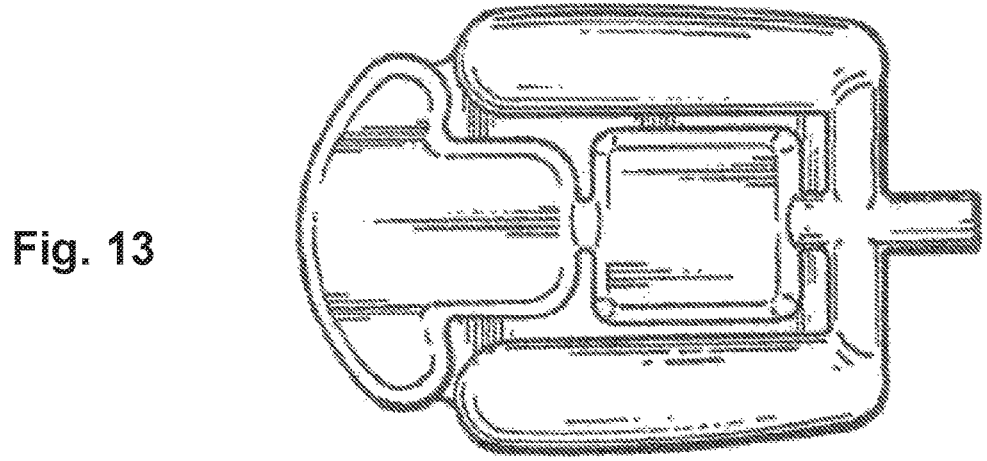
FIG. 13 is a top elevation view of the cushioning device illustrated in FIGS. 11 and 12.
Figure 14:
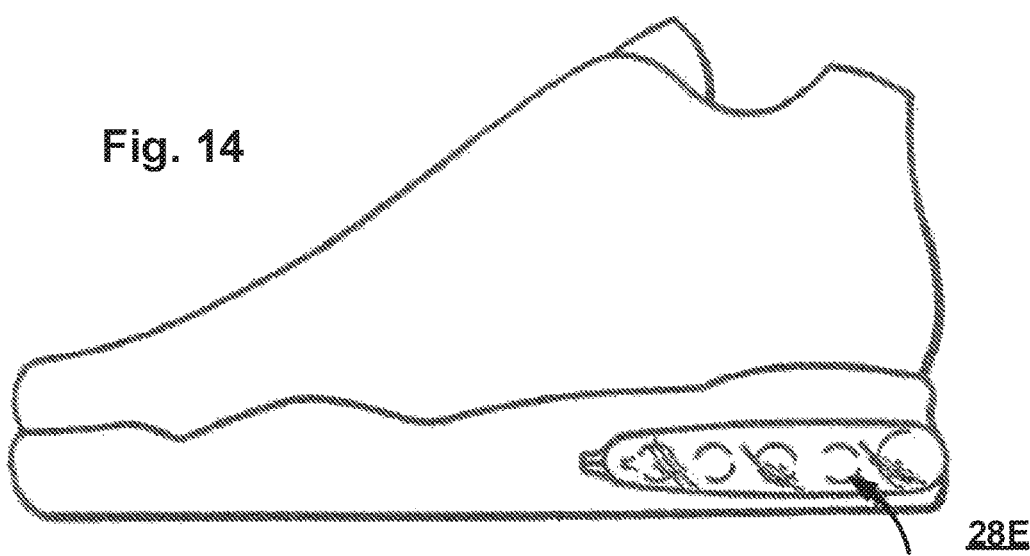
FIG. 14 is a side elevation view of an athletic shoe having another alternative cushioning device embodiment.
Figure 15:
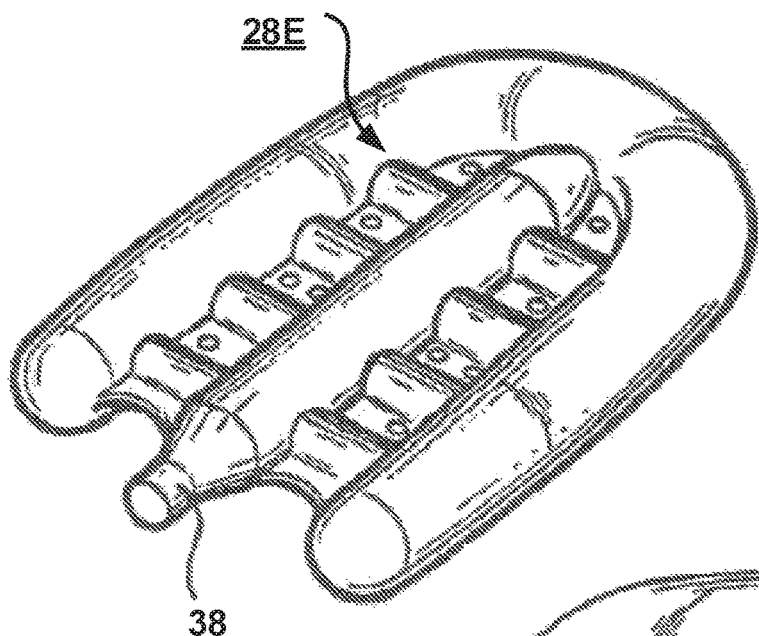
FIG. 15 is a perspective view of the cushioning device illustrated in FIG. 14.
Figure 16:
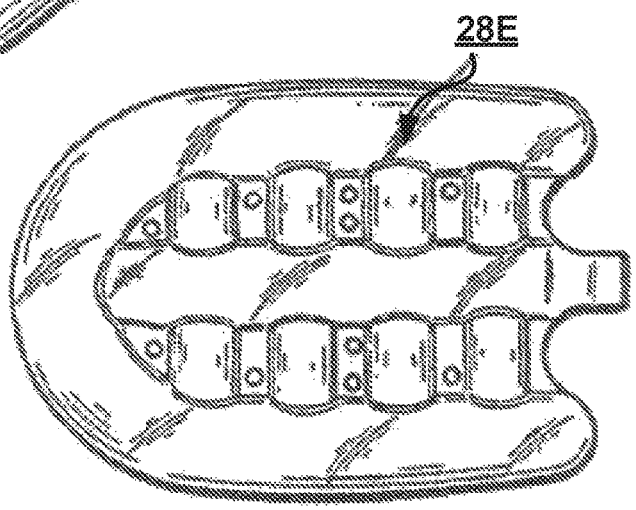
FIG. 16 is a top view of the cushioning device illustrated in FIGS. 14 and 15.

In another suitable blow molding approach, air bladders are formed by co-extruding parisons including two or more film layers. The parisons are blown and formed using conventional blow molding techniques. The resulting bladders, which are illustrated by FIGS. 12 and 15, are then inflated with the desired captive gas to the desired initial inflation pressure. The bladders may include an inflation port that can be sealed by RF welding or other suitable techniques.

Figure 17:
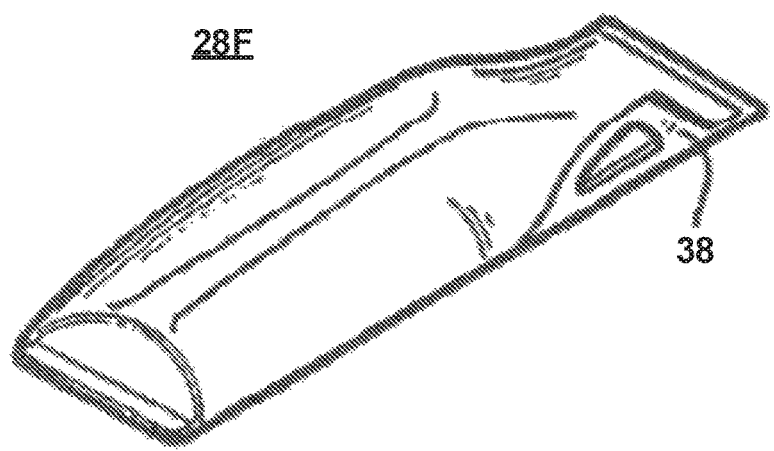
FIG. 17 is a perspective view of an alternative cushioning device embodiment.
Figure 18:
FIG. 18 is a side view of the cushioning device illustrated in FIG. 17.

In yet another approach, the cushioning device is fabricated by forming co-extruded multilayer tubing that is collapsed to a lay flat configuration. The opposite walls are welded together at selected points and at each end using conventional heat sealing techniques or RF welding. The device is then inflated through a formed inflation port to the desired inflation pressure. FIGS. 17 and 18 illustrate cushioning devices made using this approach.

The cushioning devices described above and shown in FIGS. 1-18 are designed to be used as midsoles for articles of footwear, and particularly in athletic shoes. In such applications, the devices may be used in any one of several different examples including: (1) completely encapsulated in a suitable midsole foam; (2) encapsulated only on the top portion of the unit to fill-in and smooth-out the uneven surfaces for added comfort under the foot; (3) encapsulated on the bottom portion to assist attachment of the out-sole; (4) encapsulated on the top and bottom portions but exposing the perimeter sides for cosmetic and marketing reasons; (5) encapsulated on the top and bottom portions but exposing only selected portions of the sides of the unit; (6) encapsulated on the top portion by a molded "footbed"; and (7) used with no encapsulation foam whatsoever.

Figure 19:
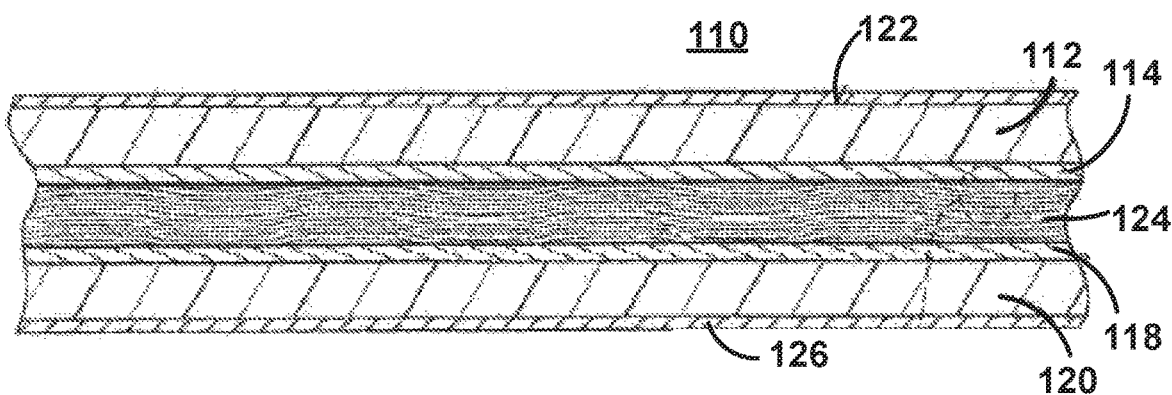
FIG. 19 shows a membrane including TPU cap layers, TPU structural layers, and a core layer including alternating TPU and barrier microlayers.
Figure 20:
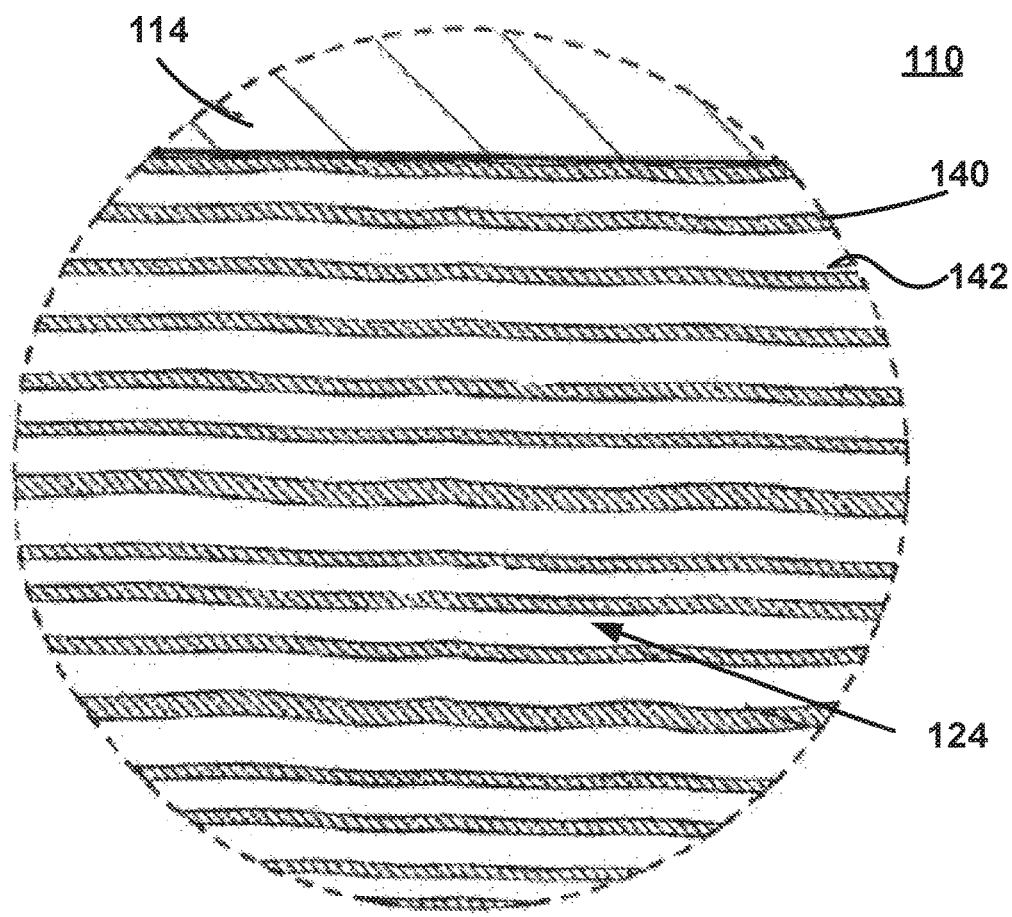
FIG. 20 shows an expanded view of a section of the membrane of FIG. 19.

FIGS. 19 and 20 illustrate another multi-layered structure configuration within the disclosure. As shown in FIG. 19, multi-layered structure 110 has a core layer 124 which includes a composite of alternating TPU and barrier microlayers. Layers 114 and 118 are tie layers including a TPU elastomer. Layers 112 and 120 are structural TPU layers. Multi-layered structure 110 also has TPU cap layers 122 and 126, shown as thin layers here, though they need not be thin. At least one of TPU cap layers 122 and 126 in multi-layered structure 110 is a polydiene polyol-based TPU.

FIG. 20 shows an expanded view of a section of the multilayer multi-layered structure 110 of FIG. 19. A portion of tie layer 114 borders a portion of core layer 124. Discrete, alternating TPU elastomer microlayers 142 and barrier microlayers 140 are shown. The barrier microlayers can be formed from an ethylene-vinyl alcohol copolymer.

In another aspect, the disclosure relates to articles of manufacture made from the multi-layered structures or inflated structures described above. In particular, the articles of manufacture may include shoes (dress shoes, athletic footwear, hiking boots, work boots, or the like), skates (hockey skates, figure skates, in-line skates, roller skates, or the like), balls (soccer balls, footballs, basketballs, kickballs, etc.), tires (vehicle tires, bicycle tires, inner tubes, or the like), bicycle seats, saddles, personal protective articles (e.g., helmets, shin guards, hockey gloves, chest protectors), flexible flotation devices (life jackets), rigid flotation devices (e.g., boat hulls), medical devices (e.g., catheter balloons), prosthetic devices, orthopedic devices, accumulators, or article of furniture made from the multi-layered structures or from the bladders, cushioning devices, or substantially closed containers.

In an aspect, the present disclosure provides for a multi-layered structure comprising: a core layer having a first side and a second side; and a first cap layer, the first cap layer having a cap layer first side and a cap layer second side, the first side of the first cap layer being in direct contact with the first side of the core layer; wherein the first cap layer comprises a blended material comprising at least one thermoplastic material; and at least one rubber compound.

In an aspect, the present disclosure provides for the multi-layered structure where the at least one thermoplastic material comprises a polydiene polyol-based thermoplastic polyurethane (TPU), ester-based TPU, ether-based TPU or combinations thereof.

In an aspect, the present disclosure provides for the multi-layered structure where the core layer comprises at least one thermoplastic material.

In an aspect, the present disclosure provides for the multi-layered structure where the at least one thermoplastic material of the core layer comprises a polydiene polyol-based TPU, ethylene-vinyl alcohol copolymers or combinations thereof.

In an aspect, the present disclosure provides for the multi-layered structure where the polydiene polyol-based TPU comprises at least one hard segment and at least one soft segment, the TPU having a hard segment content and a soft segment content, wherein the hard segment content is about 20 wt. % to about 50 wt. % and the soft segment content is about 50 wt. % to about 80 wt. %.

In an aspect, the present disclosure provides for the multi-layered structure where the soft segment comprises a poly-(C1-C6)-hydroxyl-terminated diol.

In an aspect, the present disclosure provides for the multi-layered structure where the soft segment comprises a hydroxyl-terminated diol based on a homopolymer of butadiene.

In an aspect, the present disclosure provides for the multi-layered structure where the soft segment comprises a vinyl content of about 30 wt. % to about 80 wt. %.

In an aspect, the present disclosure provides for the multi-layered structure where the hard segment comprises —(C6-C18)-arylene-(C1-C6)-alkylene-(C6-C18)-arylene segments.

In an aspect, the present disclosure provides for the multi-layered structure where the hard segment comprises —(C6-C10)-arylene-(C1-C3)-alkylene-(C6-C10)-arylene segments.

In an aspect, the present disclosure provides for the multi-layered structure where the hard segment comprises-phenylene-methylene-phenylene segments.

In an aspect, the present disclosure provides for the multi-layered structure where the first cap layer comprises about 20 wt. % to about 80 wt. % of the at least one thermoplastic material; and about 20 wt. % to about 80 wt. % of the at least one rubber compound.

In an aspect, the present disclosure provides for the multi-layered structure where the first cap layer further comprises at least one curing agent.

In an aspect, the present disclosure provides for the multi-layered structure where the at least one curing agent is a sulfur-based or peroxide-based curing agent.

In an aspect, the present disclosure provides for the multi-layered structure where the first cap layer comprises less than about 2 wt. % of the at least one curing agent.

In an aspect, the present disclosure provides for the multi-layered structure where the first cap layer further comprises a tackifier.

In an aspect, the present disclosure provides for the multi-layered structure where the first cap layer comprises less than about 40 wt. % tackifier.

In an aspect, the present disclosure provides for the multi-layered structure where the multi-layered structure of a given thickness has a gas transmission rate for nitrogen that is at least about ten times lower than the gas transmission rate for nitrogen of a butyl rubber layer of substantially the same thickness as the thickness of the multi-layered structure.

In an aspect, the present disclosure provides for the multi-layered structure where the gas transmission rate of at least one of the core layer and the multi-layered structure is from about 0.001 $cm^3/m^2 \cdot atm \cdot day$ to about 1 $cm^3/m^2 \cdot atm \cdot day$.

In an aspect, the present disclosure provides for the multi-layered structure where a peel strength of the first cap layer to a thermoplastic polyurethane (TPU) substrate is from about 2 N/mm to about 6 N/mm or the peel strength of the cap layer to an uncured rubber substrate is from about 1 N/mm to about 3 N/mm.

In an aspect, the present disclosure provides for the multi-layered structure where the at least one rubber compound is uncured or partially cured.

In an aspect, the present disclosure provides for the multi-layered structure where the rubber compound further comprises at least one of fillers; process oils; and a curing package comprising at least one of crosslinking initiator(s), crosslinking accelerator(s), and crosslinking retarder(s).

In an aspect, the present disclosure provides for the multi-layered structure where the rubber compound further comprises a curing package comprising at least one of crosslinking initiator(s), crosslinking accelerator(s), and crosslinking retarder(s).

In an aspect, the present disclosure provides for the multi-layered structure where the rubber compound is a natural rubber, a synthetic rubber, or a combination of both.

In an aspect, the present disclosure provides for the multi-layered structure where the rubber compound is natural rubber, butyl rubber, neoprene rubber, nitrile rubber, isoprene rubber, butadiene rubber, styrene-butadiene rubber, ethylene propylene diene monomer (EPDM) rubber, ethylene-propylene rubber, urethane rubber or any combination thereof.

In an aspect, the present disclosure provides for the multi-layered structure where the rubber compound is an isoprene rubber, a butyl rubber, a butadiene rubber, a styrene-butadiene rubber or any combination thereof.

In an aspect, the present disclosure provides for the multi-layered structure where the rubber compound is styrene-butadiene rubber.

In an aspect, the present disclosure provides for the multi-layered structure where the at least one rubber compound is uncured.

In an aspect, the present disclosure provides for the multi-layered structure where the at least one rubber compound is uncured rubber, including uncured natural rubber, uncured polyisoprene rubber, uncured butyl rubber or any combination thereof.

In an aspect, the present disclosure provides for the multi-layered structure where the blended material further comprises at least one of a vulcanization accelerator and a vulcanization aid.

In an aspect, the present disclosure provides for the multi-layered structure where the vulcanization aid comprises zinc oxide, stearic acid, or a combination of both.

In an aspect, the present disclosure provides for the multi-layered structure further comprises a first release layer in direct contact with the second side of the first cap layer.

In an aspect, the present disclosure provides for the multi-layered structure further comprises a second cap layer having a second cap layer first side and a second cap layer second side, the first side being in direct contact with the second side of the core layer.

In an aspect, the present disclosure provides for the multi-layered structure further comprises a second release layer in direct contact with the second side of the second cap layer.

In an aspect, the present disclosure provides for the multi-layered structure where the at least one of the first release liner and the second release liner comprises a polyalkylene or a polyalkylene terephthalate.

In an aspect, the present disclosure provides for the multi-layered structure where the core layer comprises a multi-layer polymeric material.

In an aspect, the present disclosure provides for the multi-layered structure where the multi-layer polymeric material comprises alternating layers of a first thermoplastic material and a second thermoplastic material, wherein a layer of the second thermoplastic material has a lower nitrogen gas permeability than a layer of the first thermoplastic material.

In an aspect, the present disclosure provides for the multi-layered structure where the layer of the second thermoplastic material has an average thickness of from about 0.1 microns to about 50 microns.

In an aspect, the present disclosure provides for the multi-layered structure where the multi-layer polymeric material comprises ethylene-vinyl alcohol copolymer layers.

In an aspect, the present disclosure provides for the multi-layered structure where the multi-layer polymeric material comprises alternating polyester polyol-based TPU layers and ethylene-vinyl alcohol copolymer layers.

In an aspect, the present disclosure provides for the multi-layered structure where the multi-layered polymeric material further comprises structural layers formed of repurposed polymeric materials.

In an aspect, the present disclosure provides for the multi-layered structure where the at least one of the first side of the core layer and the second side of the core layer comprise a polydiene polyol-based TPU.

In an aspect, the present disclosure provides for a method of manufacturing the multi-layered structure as described herein, comprising: laminating or co-extruding the core layer with the first cap layer: the core layer having the first side and the second side; and the first cap layer having the cap layer first side and the cap layer second side, the first side of the first cap layer being in direct contact with the first side of the core layer; wherein the first cap layer comprises the blended material comprising the at least one thermoplastic material; and the at least one rubber compound.

In an aspect, the present disclosure provides for the blended material further comprises at least one curing agent for the at least one rubber compound.

In an aspect, the present disclosure provides for the method that further comprises applying a first release layer in direct contact with the second side of the first cap layer.

In an aspect, the present disclosure provides for the method that further comprises laminating or co-extruding, in conjunction with the core layer and the first cap layer, a second cap layer having a second cap layer first side and a second cap layer second side, the first side being in direct contact with the second side of the core layer.

In an aspect, the present disclosure provides for the method that further comprises applying a second release layer in direct contact with the second side of the second cap layer.

In an aspect, the present disclosure provides for a method of manufacturing the multi-layered structure described herein, comprising: extruding the core layer, the core layer having the first side and the second side; and laminating or transfer-coating the first cap layer onto the core layer, the first cap layer having the cap layer first side and the cap layer second side, the first side of the first cap layer being in direct contact with the first side of the core layer; wherein the first cap layer comprises the blended material comprising at least one thermoplastic material; and at least one rubber compound.

In an aspect, the present disclosure provides for the method of manufacturing the multi-layered structure that further comprises applying a first release layer in direct contact with the second side of the first cap layer.

In an aspect, the present disclosure provides for the method of manufacturing the multi-layered structure that further comprises laminating or transfer-coating a second cap layer having a second cap layer first side and a second cap layer second side, onto the core layer, the first side being in direct contact with the second side of the core layer, wherein the laminating or transfer-coating of the second cap layer is after the laminating or transfer-coating of the first cap layer.

In an aspect, the present disclosure provides for the method of manufacturing the multi-layered structure that further comprises laminating or transfer-coating a second cap layer having a second cap layer first side and a second cap layer second side, onto the core layer, the first side being in direct contact with the second side of the core layer, wherein the laminating or transfer-coating of the second cap layer is substantially at the same time as the laminating of the first cap layer.

In an aspect, the present disclosure provides for the method of manufacturing the multi-layered structure that further comprises applying a second release layer in direct contact with the second side of the second cap layer.

In an aspect, the present disclosure provides for a method of making a vulcanized article, comprising: placing a cap layer of a multi-layered structure in direct contact with a portion of uncured or partially cured rubber to form a layered article; and exposing the layered article to a condition effective to vulcanize at least the portion of the rubber in direct contact with the cap layer to produce the vulcanized article; wherein the cap layer comprises a blended material comprising at least one thermoplastic material; and at least one uncured or partially cured rubber compound.

In an aspect, the present disclosure provides for the method of making the vulcanized article where the blended material further comprises at least one curing agent for the at least one uncured or partially cured rubber compound.

In an aspect, the present disclosure provides for the method of making the vulcanized article where the placing comprises placing the multi-layered structure and the uncured or partially cured rubber in a mold.

In an aspect, the present disclosure provides for the method of making the vulcanized article where the exposing is conducted in the mold, and further comprising removing the vulcanized article from the mold after exposing the layered article.

In an aspect, the present disclosure provides for a vulcanized article made by the methods provided herein.

In an aspect, the present disclosure provides for the method of making the vulcanized article where a vulcanized article comprising: a multi-layered structure comprising a layer having a first side and a second side; the layer comprising a blend of a thermoplastic polymer and a vulcanized rubber; the layer being bonded on the first side to a thermoplastic polymer substrate, and on the second side to a vulcanized rubber substrate.

As used herein, the following terms have the meanings ascribed to them unless specified otherwise. In this disclosure, "consisting essentially of" or "consists essentially" or the like, when applied to methods, structures, articles, and compositions encompassed by the present disclosure refers to methods, structures, articles, and compositions like those disclosed herein, but which may contain additional steps, components, chemicals, and the like. Such additional steps, components, chemicals, and the like however, do not materially affect the basic and novel characteristic(s) (e.g., gas transmission rate of a gas such as nitrogen, peel strength, durability, and the like) of the steps, components, chemicals, and the like, compared to those of the corresponding steps, components, chemicals, and the like disclosed herein. "Consisting essentially of" or "consists essentially" or the like, when applied to steps, components, chemicals, and the like encompassed by the present disclosure have the meaning ascribed in U.S. Patent law and the term is open-ended, allowing for the presence of more than that which is recited so long as basic or novel characteristics of that which is recited is not changed by the presence of more than that which is recited, but excludes prior art embodiments.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, "about 0" can refer to 0, 0.001, 0.01, or 0.1. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

Example

The present disclosure can be better understood by reference to the following example which are offered by way of illustration. The present disclosure is not limited to the example given herein.

Introduction

The material is a blend of olefinic TPU and rubber with a curing package. A tackifier may be added to increase the tack to uncured rubber if needed. The olefinic TPU contains soft segments of polybutadiene diol (e.g., Krasol®). The vinyl content is approximately 65 mol. % and the total cis- and trans-1,4 substitution is approximately 35 mol. %. Other, non-polybutadiene-based, soft segment may also be used as the secondary soft segment. The content of the secondary soft segment, when present, is from about 1 mol. % to about 50 mol. % of the total soft segment content. The hard segment and chain extender can be selected from those that are commonly used in TPU synthesis. An example of the hard segment is methylene diphenyldiisocyanate (MDI). 2-Ethyl-1,3-hexanediol and 2,2,4-trimethyl-1,3-pentanediol are chain extenders that are miscible with Krasol®. The hard segment content can vary from about 20 to 50% by weight.

The rubber used in the blend can be either natural or synthetic rubber, or a mixture of the two. The blend can also include a curing agent and/or a tackifier. The curing agent can be selected from curatives that are commonly used for rubber such as sulfur and accelerator. Peroxides can also be used. Tackifier is used to increase the tack of the blend to rubber and to itself. Liquid polybutadienes such as Poly bd R20LM can be used.

Compositions

TPU: 20-80% by weight; Rubber: 20-80% by weight; Curing agent: no more than 2% by weight; Tackifier: <40% by weight.

Effect of Blend Composition on Bond Strength

Table 1 shows the peel strength between the blend and substrate of either TPU or rubber. All blends contain 1 wt % of Vul-Cup 40C as curing agent. The blend sheet was placed between two rubber or two TPU (TPW480) sheets and the composite was cured at 170° C. for 23 min. The samples were peeled at 20"/min.

TABLE 1

Adhesion between blend and substrates

| Substrate | | TPU/Rubber ratio | | | | | | |
|---|---|---|---|---|---|---|---|---|
| | | 80/20 | 70/30 | 60/40 | 50/50 | 40/60 | 30/70 | 20/80 |
| TPU | Peel (N/mm) | 5.8 | 5 | 5.8 | 5.3 | 4.5 | 3.5 | 2.2 |
| | Failure mode | Cohesive | Cohesive | Adhesive | Adhesive | Adhesive | Adhesive | Adhesive |
| Rubber | Peel (N/mm) | 1.2 | 1.2 | 1.5 | 1.2 | 1.5 | 2.9 | 3 |
| | Failure mode | Adhesive | Adhesive | Adhesive | Adhesive | Adhesive | Cohesive | Cohesive |

Effect of Composition on Green Tack

A blend sheet was pressed onto a piece of uncured rubber or another blend sheet of the same blend at room temperature. The samples were cut to 1" strips and peeled at 5"/min. The results are shown in Table 2.

TABLE 2

Green tack of blends to either rubber or itself

| | Peel (N/mm) | | | | | | |
|---|---|---|---|---|---|---|---|
| TPU/rubber | 20/80 | 30/70 | 40/60 | 50/50 | 60/40 | 70/30 | 80/20 |
| To self | 0.6 | 0.7 | 0.9 | 0.7 | 0.7 | 0.6 | 0.4 |
| To rubber | ** | 2.1 | 1.2 | 1.3 | 0.3 | 0.3 | 0.1 |

** Rubber is stretched thin; peel could not start.

What is claimed is:

1. A vulcanized article comprising:
   a cured rubber layer; and
   a core layer having a first side and a second side, wherein the core layer is a composite of alternating TPU microlayers and ethylene-vinyl alcohol copolymer barrier microlayers; and
   a first cap layer, the first cap layer having a cap layer first side and a cap layer second side, the first side of the first cap layer being in direct contact with the first side of the core layer;
   wherein the first cap layer comprises a blended material comprising at least one thermoplastic material and at least one rubber compound,
   wherein the at least one thermoplastic material comprises a polydiene polyol-based thermoplastic polyurethane (TPU) and wherein the at least one rubber compound is cured or partially cured,
   wherein the cured rubber layer is disposed directly on the cap layer second side of the first cap layer, wherein the cured rubber layer is bonded to and crosslinked with the cap layer on the cap layer second side.

2. The multi-layered structure of claim 1, wherein the polydiene polyol-based TPU comprises at least one hard segment and at least one soft segment, the TPU having a hard segment content and a soft segment content, wherein the hard segment content is about 20 wt. % to about 50 wt. % and the soft segment content is about 50 wt. % to about 80 wt. %.

3. The multi-layered structure of claim 2, wherein the soft segment comprises a poly-(C1-C6)-hydroxyl-terminated diol.

4. The multi-layered structure of claim 2, wherein the soft segment comprises a hydroxyl-terminated diol based on a homopolymer of butadiene.

5. The multi-layered structure of claim 2, wherein the soft segment comprises a vinyl content of from about 30 wt. % to about 80 wt %.

6. The multi-layered structure of claim 2, wherein the hard segment comprises —(C6-C18)-arylene-(C1-C6)-alkylene-(C6-C18)-arylene segments.

7. The multi-layered structure of claim 2, wherein the hard segment comprises —(C6-C10)-arylene-(C1-C3)-alkylene-(C6-C10)-arylene segments.

8. The multi-layered structure of claim 2, wherein the hard segment comprises -phenylene-methylene-phenylene segments.

9. The multi-layered structure of claim 1, wherein the first cap layer comprises about 20 wt. % to about 80 wt. % of the at least one thermoplastic material; and about 20 wt. % to about 80 wt. % of the at least one rubber compound.

10. The multi-layered structure of claim 1, wherein the first cap layer further comprises a tackifier.

11. The multi-layered structure of claim 10, wherein the first cap layer comprises less than about 40 wt. % tackifier.

12. The multi-layered structure of claim 1, wherein the multi-layered structure of a given thickness has a gas transmission rate for nitrogen that is at least about ten times lower than the gas transmission rate for nitrogen of a butyl rubber layer of substantially the same thickness as the thickness of the multi-layered structure.

13. The multi-layered structure of claim 1, wherein the gas transmission rate of at least one of the core layer and the multi-layered structure is about 0.001 $cm^3/m^2 \cdot atm \cdot day$ to about 1 $cm^3/m^2 \cdot atm \cdot day$.

14. The multi-layered structure of claim 1, wherein a peel strength of the first cap layer to a thermoplastic polyurethane (TPU) substrate is about 2 N/mm to about 6 N/mm or the peel strength of the cap layer to the rubber substrate is about 1 N/mm to about 3 N/mm.

15. The multi-layered structure of claim 1, wherein the rubber compound is a natural rubber, a synthetic rubber, or a combination of both.

16. The multi-layered structure of claim 1, wherein the rubber compound is natural rubber, butyl rubber, neoprene rubber, nitrile rubber, isoprene rubber, butadiene rubber, styrene-butadiene rubber, ethylene propylene diene monomer (EPDM) rubber, ethylene-propylene rubber, urethane rubber or any combination thereof.

17. The multi-layered structure of claim 1, wherein the rubber compound is an isoprene rubber, a butyl rubber, a butadiene rubber, a styrene-butadiene rubber or any combination thereof.

18. The multi-layered structure of claim 1, wherein the rubber compound is styrene-butadiene rubber.

19. The multi-layered structure of claim 1, further comprising a second cap layer having a second cap layer first side and a second cap layer second side, the second cap layer first side being in direct contact with the second side of the core layer, wherein the second cap layer second side is bonded on the first side to a thermoplastic polymer substrate.

20. The multi-layered structure of claim 1, wherein the multi-layer polymeric material comprises alternating layers of a first thermoplastic material and a second thermoplastic material, wherein a layer of the second thermoplastic material has a lower nitrogen gas permeability than a layer of the first thermoplastic material.

21. The multi-layered structure of claim 20, wherein the layer of the second thermoplastic material has an average thickness of about 0.1 microns to about 50 microns.

22. The multi-layered structure of claim 1, wherein the multi-layer polymeric material comprises alternating polyester polyol-based TPU layers and ethylene-vinyl alcohol copolymer layers.

23. The multi-layered structure of claim 1, wherein the multi-layered polymeric material further comprises structural layers formed of repurposed polymeric materials.

24. The multi-layered structure of claim 1, wherein at least one of the first side of the core layer and the second side of the core layer comprise a polydiene polyol-based TPU.

25. The multi-layered structure of claim 1, wherein the TPU of the TPU microlayers of the core is made using polyether polyols, polyester polyols, polycarbonate polyols, polycapralactone polyols, or any combination thereof.

26. The multi-layered structure of claim 1, wherein the blended material comprises about 20 weight percent to about 80 weight percent of the polydiene polyol-based TPU.

27. The multi-layered structure of claim 1, wherein the blended material comprises about 20 weight percent to about 80 weight percent of the cured or partially cured rubber.

28. The vulcanized article of claim 1, wherein the vulcanized article is an article of footwear.

* * * * *